US010891683B2

(12) United States Patent
Harmon et al.

(10) Patent No.: US 10,891,683 B2
(45) Date of Patent: Jan. 12, 2021

(54) PURCHASE AND DELIVERY SYSTEM AND METHOD

(71) Applicant: MASTERCARD INTERNATIONAL INCORPORATED, Purchase, NY (US)

(72) Inventors: Regan E. Harmon, O'Fallon, MO (US); Matthew Wease, St. Louis, MO (US); William Raymond Bowie, Lake St. Louis, MO (US); Christopher T. Scholl, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 290 days.

(21) Appl. No.: 15/895,779

(22) Filed: Feb. 13, 2018

(65) Prior Publication Data

US 2019/0251621 A1 Aug. 15, 2019

(51) Int. Cl.

*G06Q 30/06* (2012.01)
*G06Q 20/12* (2012.01)
*G06Q 10/08* (2012.01)

(52) U.S. Cl.

CPC ..... *G06Q 30/0641* (2013.01); *G06Q 10/0834* (2013.01); *G06Q 20/12* (2013.01); *G06Q 30/0619* (2013.01)

(58) Field of Classification Search

CPC ..... G06Q 30/06; G06Q 30/0601–0643; G06Q 30/08; G06Q 10/08; G06Q 10/083–08355; G06Q 50/10; G06Q 50/12

See application file for complete search history.

(56) References Cited

U.S. PATENT DOCUMENTS 9,710,779 B1 * 7/2017 Maloney ............ G06Q 10/0833
2008/0010223 A1 1/2008 Hoffman
2009/0177502 A1 7/2009 Doinoff
2014/0258010 A1 * 9/2014 Mardikar ............ G06Q 20/202 705/21
2014/0278635 A1 9/2014 Fulton (Continued)

OTHER PUBLICATIONS

PayUPaisa Launches 'Release on Delivery' Option, An Alternative to COD Transactions. Arun Prabhudesai. Apr 17, 2015. [https://trak.in/tags/business/2013/11/21/payupaisa-release-delivery-option-cod/] (Year: 2015).*

*Primary Examiner* — William J Allen
(74) *Attorney, Agent, or Firm* — Armstrong Teadale LLP

(57) ABSTRACT

A delivery service (DS) computing device for item purchase and delivery is provided. The DS computing device displays a searchable interface that enables a user to select at least one merchant. The DS computing device receives at least one selected merchant location from the user, displays item data of the at least one selected merchant location, and receives cart data from the user. The DS computing device receives, from the user, a selection of a selected carrier, and transmits the cart data to the selected carrier. The DS computing device generates a secure virtual account number for the selected carrier. The secure virtual account number provides access to purchase funds for use, by the selected carrier, in purchasing the selected item. The DS computing device processes a payment transaction for the at least one selected item that includes the purchase funds and a delivery service fee.

15 Claims, 9 Drawing Sheets

CARDHOLDER
TRANSACTION BEGINS
100
102
104
MERCHANT
AUTHENTICATION
106
MERCHANT BANK
DS Computing Device 116
108
Network
MERCHANT PAYMENT
TRANSACTION SUBMITTED
110
ISSUER
MERCHANT PAYMENT
112
CARDHOLDER ACCOUNT
ACCOUNTHOLDER PAYMENT

(56) References Cited

U.S. PATENT DOCUMENTS

2016/0063435 A1* 3/2016 Shah .................. G06Q 10/0833
705/44
2016/0086128 A1 3/2016 Geiger
2016/0148302 A1* 5/2016 Carr ................... G06Q 30/0635
705/26.81
2017/0293950 A1* 10/2017 Rathod .................. G06Q 30/02
2018/0096414 A1* 4/2018 Iacono ............... G06Q 30/0637
2018/0322203 A1* 11/2018 Zhang .................... G06Q 50/12

* cited by examiner

PURCHASE AND DELIVERY SYSTEM AND METHOD

BACKGROUND

This disclosure relates generally to on-demand services and, more specifically, to network-based systems and methods for item pick-up and delivery services tied to purchase transactions via a delivery service system.

On-demand services are increasingly desirable by consumers, particularly when it comes to obtaining an item as soon as it is purchased. In a best case scenario, a consumer would physically go to a nearby merchant, find the exact item they want, purchase it, and take it with them immediately after purchasing. Additionally, this best case scenario assumes the consumer would also have the time and transportation means to get to and from the merchant, as well as to transport the item after purchase. However, purchasing an item and obtaining the item immediately is not always possible. For instance, if a consumer wants a specific item right away (e.g., same day), they may be able to find local merchants that have the item in stock (such as by searching merchant inventory online or by calling the merchant), but would need to go pick up the item themselves. In some cases, the consumer may find a local merchant that is willing to deliver, but the consumer may have little to no choice in selecting the delivery terms (e.g., delivery driver, delivery time, and delivery fee). Additionally, if a consumer wants to purchase items from multiple merchants, the consumer would need to go pick up the items from a number of different merchant locations. As an alternative, the consumer may find the item at an online merchant and be forced to pay an expensive fee for same-day shipping or wait longer for next-day or 2-day shipping. Accordingly, an on-demand delivery system that directly connects consumers with delivery carriers is needed where consumers can set delivery terms and where item pick-up and delivery services (especially same-day, relatively short-distance deliveries) are integrated as part of the item purchase transaction.

BRIEF DESCRIPTION OF THE DISCLOSURE

In one aspect, a delivery service (DS) computing device is provided. The delivery service computing device includes a processor in communication with a memory. The processor is programmed to display to a user a searchable interface that enables the user to select at least one merchant, wherein the at least one merchant has one or more locations. The processor is further programmed to receive, from the user, at least one selected merchant location, wherein the at least one selected merchant location is associated with the one or more locations of the at least one merchant. The processor is further programmed to display, to the user, item data of the at least one selected merchant location. The processor is further programmed to receive, from the user, cart data via the searchable interface, wherein the cart data identifies at least one selected item offered for sale by the at least one selected merchant location. The processor is further programmed to receive, from the user, a selection of a selected carrier, wherein the selected carrier is a registered carrier. The processor is further programmed to transmit the cart data to the selected carrier, the cart data instructing the selected carrier to purchase the at least one selected item identified by the cart data at the selected merchant location and subsequently deliver the selected item to the user. The processor is further programmed to generate a secure virtual account number for the selected carrier, wherein the secure virtual account number provides access to purchase funds for use, by the selected carrier, in purchasing the at least one selected item on behalf of the user. The processor is further programmed to process a payment transaction for the at least one selected item that includes the purchase funds and a delivery service fee.

In another aspect, a computer-implemented method for providing a delivery service is provided. The method is performed using a delivery service (DS) computing device including a processor in communication with a memory. The method includes displaying, to a user, a searchable interface that enables the user to select at least one merchant, wherein the at least one merchant has one or more locations. The method further includes receiving, from the user, at least one selected merchant location, wherein the at least one selected merchant location is associated with the one or more locations of the at least one merchant. The method further includes displaying, to the user, item data of the at least one selected merchant location. The method further includes receiving, from the user, cart data via the searchable interface, wherein the cart data identifies the at least one selected item offered for sale by the at least one selected merchant location. The method also includes receiving, from the user, a selection of a selected carrier, wherein the selected carrier is a registered carrier. The method further includes transmitting the cart data to the selected carrier, the cart data instructing the selected carrier to purchase the at least one selected item identified by the cart data at the at least one selected merchant location and subsequently deliver the at least one selected item to the user. The method further includes generating a secure virtual account number for the selected carrier, wherein the secure virtual account number provides access to purchase funds for use, by the selected carrier, in purchasing the at least one selected item. The method further includes processing a payment transaction for the at least one selected item that includes the purchase funds and a delivery service fee.

In yet another aspect, a non-transitory computer-readable storage media having computer-executable instructions embodied thereon is provided. When executed by a delivery service (DS) computing device including at least one processor coupled to a memory, the computer-executable instructions cause the DS computing device to display, to a user, a searchable interface that enables the user to select at least one merchant, wherein the at least one merchant has one or more locations. The computer-executable instructions further cause the DS computing device to receive, from the user, at least one selected merchant location, wherein the at least one selected merchant location is associated with the one or more locations of the at least one merchant. The computer-executable instructions further cause the DS computing device to display, to the user, item data of the at least one selected merchant location. The computer-executable instructions also cause the DS computing device to receive, from the user, cart data via the searchable interface, wherein the cart data identifies the at least one selected item offered for sale by the at least one selected merchant location. The computer-executable instructions further cause the DS computing device to receive, from the user, a selection of a selected carrier, wherein the selected carrier is a registered carrier. The computer-executable instructions further cause the DS computing device to transmit the cart data to the selected carrier, the cart data instructing the selected carrier to purchase the at least one selected item identified by the cart data at the at least one selected merchant location and subsequently deliver the at least one selected item to the user. The computer-executable instructions also cause the DS computing device to generate a secure virtual account number for the selected carrier, wherein the secure virtual account number provides access to purchase funds for use, by the selected carrier, in purchasing the at least one selected item. The computer-executable instructions further cause the DS computing device to process a payment transaction for the at least one selected item that includes the purchase funds and a delivery service fee.

BRIEF DESCRIPTION OF THE DRAWINGS

FIG. 1 is an example multi-party payment card processing system illustrating a delivery service (DS) computing device of a delivery service (DS) computing system in communication with a multi-party payment processing network.

FIG. 2 is an example flow diagram illustrating the payment process between a delivery service (DS) computing device and multiple parties in a payment card processing system.

FIG. 3 is an example of a delivery service (DS) system including a delivery service (DS) computing device.

FIG. 4 is an example flow diagram illustrating the flow of data between various components of the DS computing system shown in FIG. 3.

FIG. 5 is another example flow diagram illustrating the flow of data between various components of the DS computing system shown in FIG. 3 as a selected carrier purchases and delivers a selected item to a user.

FIG. 6 illustrates an example of a remote device for use in the system shown in FIG. 3.

FIG. 7 illustrates an example configuration of a server system for use in the system shown in FIG. 3.

FIG. 8 is a flowchart of an example process for providing a delivery service system using the system shown in FIG. 3.

FIG. 9 is a diagram of components of an example computing device that may be used in the DS computing system shown in FIG. 3.

Figure 1:
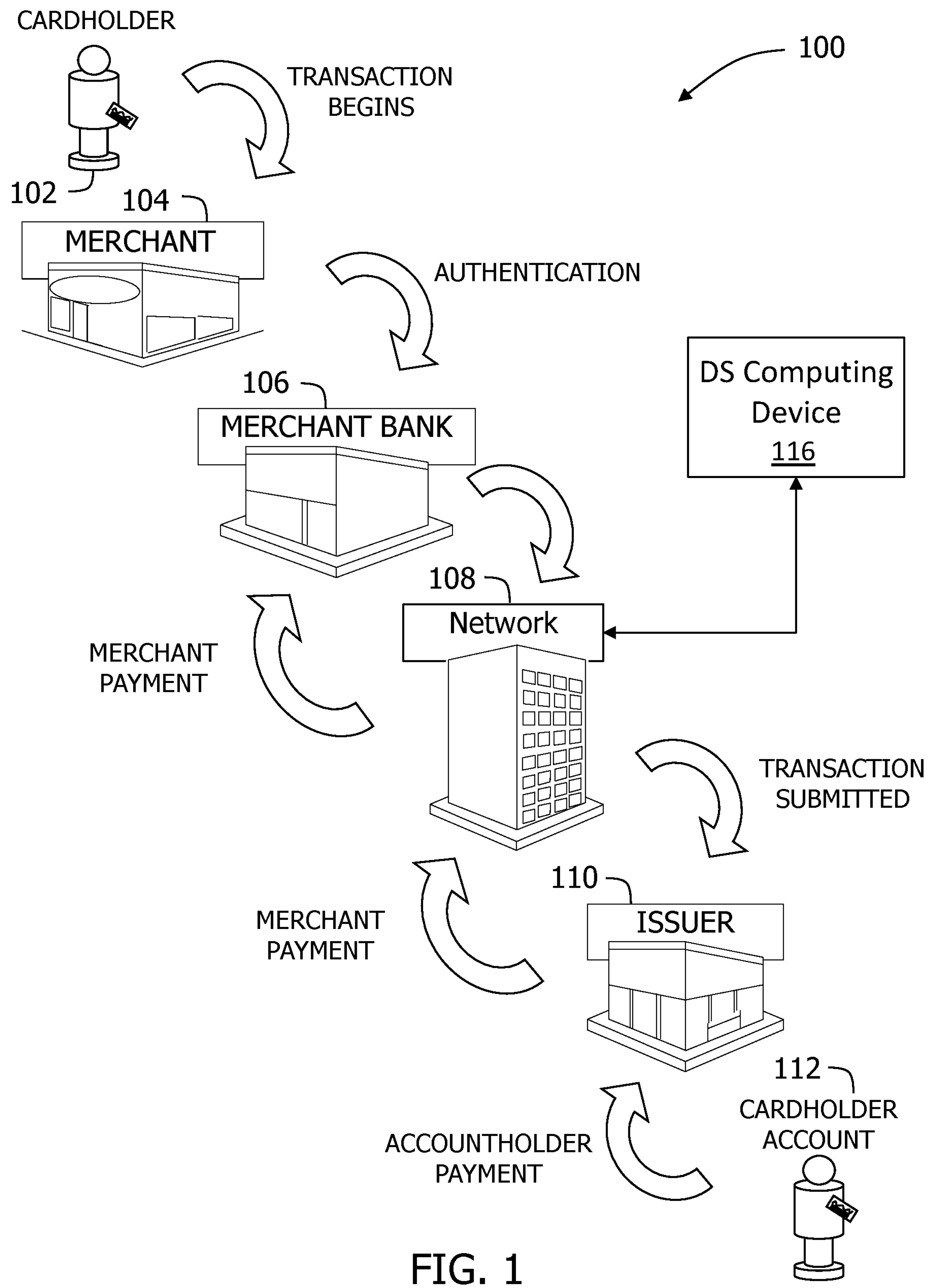
FIGS. 1-9 show example embodiments of the methods and systems described herein.

Like numbers in the Figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The systems and methods described herein are directed to an on-demand delivery service (DS) system that includes a delivery service (DS) computing device for providing a delivery service system that ties pick-up and delivery services to the purchase of an item. In the exemplary embodiment, an on-demand DS system includes a user (e.g., consumer or buyer) and a carrier, who will purchase an item (or items) on behalf of the user and deliver the item to the user. Carriers enroll or register themselves with the system (e.g., with the DS computing device). Registered carriers provide the system with availability data, including days, times, and geographic areas in which they are available to pick up items and make deliveries.

Users can browse or search for merchants with physical store locations ("merchant locations") in their surrounding area via a searchable user interface. Users can select a merchant location, and browse or search for items sold at the selected merchant location. The system allows a user to select and contract with a registered carrier ("selected carrier") to purchase the selected item (or items) at the selected merchant location, and deliver the selected item to the user. In the example embodiment, the selected carrier purchases the selected item using a secure virtual account number that provides access to purchase funds provided by the user. Item pick-up and delivery are integrated into the purchase transaction, such that payment for both the item and delivery are handled by the system at the time of purchase of the item.

In the example embodiment, because delivery carrier contracting is handled at the time of the purchase, the purchase may only be completed if a carrier has been selected and contracted at an agreed upon price. However, there is currently no system capable of providing a purchasing experience that allows a user to (i) select items from a variety of local merchants, both registered and unregistered, and (ii) select a carrier to purchase and deliver the items without having to disclose the user's personal payment information. The systems and methods described herein resolve this and other deficiencies.

In the example embodiment, the DS computing system includes a delivery service (DS) computing device that includes and/or is in communication with a merchant computing device (e.g., via Application Programming Interface calls), a carrier (e.g., delivery carrier) computing device, a user (e.g., a consumer) computing device, and a payment processing network. The DS computing device is configured to (i) display, to a user, a searchable interface that enables the user to select at least one merchant, wherein the at least one merchant has one or more locations, and wherein the DS computing device is in communication with a database for storing merchant locations, (ii) receive, from the user, at least one selected merchant location, wherein the at least one selected merchant location is associated with the one or more locations of the at least one merchant, (iii) display, to the user, item data of the at least one selected merchant location, (iv) receive, from the user, cart data via the searchable interface, wherein the cart data identifies at least one selected item offered for sale at the at least one selected merchant location, (v) receive, from the user, a selection of a selected carrier for delivering the at least one selected item to the user, wherein the selected carrier is a registered carrier, (vi) transmit the cart data to the selected carrier so that the selected carrier is prompted or instructed to purchase the at least one selected item identified by the cart data at the at least one selected merchant location and subsequently deliver the at least one selected item to the user, (vii) generate a secure virtual account number for the selected carrier, wherein the secure virtual account number provides access to purchase funds for use by the selected carrier to purchase the at least one selected item on behalf of the user, and (viii) process a payment transaction for the at least one selected item that includes the purchase funds and a delivery service fee. The DS computing device is a specifically configured computing device that is capable of functioning as described herein and includes a dedicated computing device associated solely with the DS computing system. The DS computing device includes a processor in communication with a memory.

The DS computing system further includes a database in wired and/or wireless communication with the DS computing device. In some embodiments, the database is a centralized database that is integral to the DS computing device, or in alternative embodiments the database is a separate component and external to the DS computing device. The database is accessible to the DS computing device and is configured to store and/or otherwise maintain a variety of information, as described further herein. For example, the database may store merchant item data, carrier availability data, verification rules, carrier selection rules, payment processing rules and/or any other information. The database is configured to store data to more efficiently provide on-demand carrier availability data to enable carrier selection and complete the purchase process for the selected item (or items). Subsequently, based on the most recently selected/contracted carrier, the carrier availability may be updated and re-cached in the database.

According to one or more example embodiments, the DS computing device enables carriers to enroll or register with the system. Registration may include creation of carrier profiles. Carrier profiles may include carrier-related data, such as name, address, locations, delivery type(s) (e.g., small item or large item), delivery vehicle type(s) (e.g., car, truck), delivery vehicle identifier(s) (e.g., make, model, color, license plate numbers), delivery vehicle GPS identifier(s), delivery vehicle driver identifier(s) (e.g., driver names, license numbers, mobile device contact information such as phone numbers, photographs, etc.), and contact information. Carrier-related data included in the profile of a registered carrier may be displayed to a user or merchant along with carrier availability data when carrier selection takes place, and/or may be included as part of availability data provided by the carrier.

In some embodiments, carrier registration may further include a verification process. Verification may include carrier (e.g., delivery driver) background checks, driving record checks, and car insurance checks. The verification process may be performed through third party vendors via Application Programming Interfaces (APIs). Accordingly, only carriers that pass the verification process will be registered by the DS computing device and have their delivery services offered via the DS computing system. By using the DS computing system, users can have increased confidence in the item pick-up and delivery services being provided by carriers because registered carriers have passed the verification process.

According to one or more example embodiments, merchants are not required to register with the DS computing device to offer items via the DS computing device to users. The DS computing device allows users to search for and select local merchants that have one or more locations ("merchant locations"). Merchant locations are physical stores (e.g., brick-and-mortar stores). The DS computing device may use an API to submit a query to a database associated with a selected merchant location to retrieve item data. In some embodiments, merchants may register or enroll with the system. In these embodiments, registration may include the creation of a merchant profile and a verification process.

According to one or more example embodiments, the DS computing device enables users (e.g., consumers/buyers) to register with the system. Registered users may create a user profile and input identifying data (such as name, address, etc.) and payment data (such as card/account information) that will be saved in the database associated with the DS computing device and used for payment transactions handled by the DS computing device. Registered users may receive discounts, coupons, rebates, rewards, reward points, or other incentives for item purchases and deliveries made via the DS computing system. In other embodiments, a user may prefer not to register with the DS computing device, and may still be able to utilize the DS computing system for item purchase and delivery (e.g., as a 'guest' user).

In the example embodiment, the DS computing device is configured to display, to a user, a searchable interface that enables the user to select a merchant. The merchants displayed on the searchable interface include the physical locations ("merchant locations") at which each item is available for purchase and pick-up. When a user wishes to purchase an item from a particular merchant, the user may search (or browse) the searchable interface for the merchant, and view the merchant locations near the user. The user may search or browse, for example, by merchant name, merchant website, and item type/category. Various filtering and/or sorting criteria may be provided to the user via the searchable interface.

The DS computing device is also configured to receive, from the user, a selected merchant location. After using the searchable interface to find a specific merchant, the user may view the available physical locations in the user's vicinity, and select a merchant location to purchase items from. In the example embodiment, the DS computing device is configured to display, to the user, item data of the selected merchant location. Item data may include a listing of items offered for sale by the merchant at the selected merchant location. Item data may further include details about each item, such as an item name, an image of the item, a description of the item, an item price, an estimated item price, and an item identifier (e.g., a stock keeping unit (SKU) number, bar code, catalog number, etc.). In some embodiments, item data may be retrieved from a merchant computing device such as a database or website of a merchant location. In further embodiments, the DS computing device is configured to receive, from the user, more than one selected merchant location, and display, to the user, item data of each selected merchant location. For example, if the user selects a local grocery store and a local home improvement store, the DS computing device may display to the user item data of both the selected grocery store and the selected home improvement store.

The DS computing device is then configured to receive, from the user, cart data via the searchable interface. Cart data identifies the selected item (or items) offered for sale by the selected merchant location. Cart data may include a list of items selected for purchase by the user. In some embodiments, cart data may include details of the selected item, such as an item name, an image of the item, a description of the item, an item price, and an item identifier (e.g., a stock keeping unit (SKU) number, bar code, catalog number, etc.). Additionally or alternatively, cart data may include item locator information for the selected item at the selected merchant location, such as aisle information (e.g. aisle number and/or corresponding shelf number) and a store map. Cart data may further include details about the selected merchant location for the selected item, such as merchant name, merchant category code (MCC), and merchant address. In certain embodiments, cart data may identify two or more selected items that are associated with two or more selected merchant locations. For example, cart data may identify several items for purchase at merchant location A (e.g., a local grocery store) and an item for purchase at merchant location B (e.g., a local home improvement store).

The DS computing device is also configured to receive, from the user, a selection of a selected carrier. The selected carrier is a registered carrier. In some embodiments, the DS computing device provides carrier availability data of at least one registered carrier to the user. The carrier availability data may include, for each of the at least one register carriers, an estimated time of delivery, a delivery service fee or fee range, and a performance rating based on user reviews. The estimated time of delivery for each of the at least one registered carriers may be based on proximity to a selected merchant location, item type/category, number of selected items, number of selected merchant locations, requested delivery time or time range, estimated time of delivery, and carrier performance rating. In some embodiments, registered carriers with low performance ratings may have lower delivery service fees in comparison to registered carriers with high performance ratings. Additionally or alternatively, the DS computing device may generate a carrier availability map. In these embodiments, the carrier availability map may display an availability of at least one registered carrier based on the user's cart data. The carrier availability map may display available carriers near the selected merchant location. The DS computing device provides the user with carrier availability data to enable the user to choose a selected carrier for item pick-up and delivery based on the user's preferences.

In the example embodiment, the DS computing device is then configured to transmit the user's cart data to the selected carrier. The selected carrier can purchase the selected item (or items) identified by the cart data at the selected merchant location and subsequently deliver the selected item to the user. In some embodiments, the DS computing device may receive, from the selected carrier, scanned information of the selected item (e.g., as the selected carrier retrieves the item from the shelves at the merchant location, the selected carrier can scan the item with their carrier/user computing device). The DS computing device may provide to the user, a cart status update based on the scanned information. In these embodiments, the selected carrier may scan the selected item with the selected carrier's computing device after picking up the item at the selected merchant location. For example, the selected carrier may scan the selected item (e.g., peanut butter) with a smartphone associated with the carrier after taking the item off the shelf, and the DS computing device may subsequently display, to the user (e.g., consumer), a green checkmark next to the item name. In some embodiments, the DS computing device may provide a communication channel between the selected carrier and the user. The communication channel may allow the user to make changes to the cart data in real time based on communications received from the selected carrier via the communication channel. The communication channel may include a wireless communication channel between the user computing device and the carrier computing device.

In the example embodiment, the DS computing device is also configured to generate a secure virtual account number for the selected carrier. The secure virtual account number provides access to purchase funds for the selected carrier to use in purchasing the selected item (or items). In some embodiments, the DS computing device may transmit a security code to the selected carrier. In these embodiments, the security code enables the selected carrier to access the purchase funds of the virtual account number. In certain embodiments, a registered carrier may be the selected carrier of two or more users with requested delivery times that are close in time. In these embodiments, the carrier may be provided with multiple security codes where each security code is linked to a specific user, providing access to only the specific user's purchase funds.

In the example embodiment, the DS computing device is further configured to process a payment transaction for the selected item that includes the purchase funds and the delivery service fee. The purchase funds include the cost of the selected item (or items). In some embodiments, the purchase funds may include the estimated cost of the selected item. The delivery service fee for the selected carrier may be based on the selected carrier's proximity to a selected merchant location, item type/category, number of selected items identified by the cart data, number of selected merchant locations identified by the cart data, requested delivery time or time range, estimated time of delivery, and the selected carrier's performance rating. In some embodiments, prior to processing the payment transaction, the DS computing device may be configured to receive a delivery request acknowledgement for the selected item. The delivery request acknowledgment may be received by the DS computing device from the selected carrier, the user, or both. In some embodiments, processing the payment transaction may be dependent upon receiving a delivery request acknowledgment. That is, if a delivery request acknowledgment is not received, the payment transaction for the selected item, which includes the purchase funds and the delivery service fee, will not be processed. Once a delivery request acknowledgment is received at the DS computing device, an authorization request message (such as ISO® 8583 compliant messages and ISO® 20022 compliant messages) may be transmitted to the payment processing network to process and complete the payment transaction, which includes the purchase funds and the delivery service fee. According to one or more example embodiments, the DS computing device may be in communication with the payment processing network or the DS computing device may be integral to the payment processing network.

The DS computing device is configured to receive payment data from the user to pay for the selected item and the item pick-up and delivery services. In some embodiments, the payment transaction is processed by transferring the purchase funds (e.g., payment received for the selected item) into a carrier account associated with the virtual account number, the carrier account holding the delivery service fee (e.g., the payment received for the item pick-up and delivery services). In these embodiments, the payment transaction is further processed by releasing the delivery service fee into the carrier account upon receiving a confirmation of delivery. The confirmation of delivery received by the DS computing device may be from the user. The user may provide a signature on the selected carrier's computing device and/or provide confirmation on the user's own computing device (e.g., pressing an "order received" button on user's device). Additionally or alternatively, the selected carrier may provide confirmation of delivery by entering the security code provided by the DS computing device into the user's computing device.

The technical effect of the systems and methods described herein is achieved by performing at least one of the following steps: (i) displaying, to a user, a searchable interface that enables the user to select at least one merchant, wherein the merchant has one or more locations, and wherein the DS computing device is in communication with a database for storing merchant locations; (ii) receiving, from the user, at least one selected merchant location; (iii) displaying, to the user, item data of the at least one selected merchant location, wherein item data is stored in an item database or is accessible by the DS computing device via an API connecting the DS computing device with a merchant database; (iv) receiving, from the user, cart data via the searchable interface, wherein the cart data identifies the at least one selected item offered for sale by the at least one selected merchant location; (v) receiving, from the user, a selection of a selected carrier for delivering the at least one selected item to the user, wherein the selected carrier is a registered carrier; (vi) transmitting the cart data to the selected carrier, the cart data instructing the selected carrier to purchase the at least one selected item identified by the cart data at the at least one selected merchant location and subsequently deliver the at least one selected item to the user; (vii) enabling the carrier and the user to communicate directly during the purchasing and delivery process via a communication channel provided by the DS computing device; (viii) generating a secure virtual account number for the selected carrier, wherein the secure virtual account number provides access to purchase funds for use by the selected carrier in purchasing the at least one selected item on behalf of the user; and (ix) processing a payment transaction for the at least one selected item that includes the purchase funds and a delivery service fee, wherein the payment transaction processing is performed using a payment processing network that is separate and different from the communication network used by the DS computing device, merchant computing devices, and the carrier computing devices.

The resulting technical effect achieved by the systems and methods described herein is at least one of: (i) improved delivery services, particularly for same day, relatively short distances; (ii) improved purchase experiences because users can select a delivery carrier based on factors such as a registered carrier's performance ratings, estimated delivery times, and delivery service fee; (iii) promoting convenience by enabling users to purchase items from multiple merchants in a single transaction; (iv) greater selection of purchase options because users can select items offered for sale by both registered and non-registered local merchants; (v) greater selection of delivery options because users are not limited to carriers selected by merchants; (vi) convenient, real-time item status tracking from item pick-up to transit to delivery; and (vii) increased security measures because the delivery carrier uses a virtual account number rather than a user's payment information to purchase items.

In one embodiment, a computer program is provided, and the program is embodied on a computer-readable medium. In an example embodiment, the DS computing system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the DS computing system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

The following detailed description illustrates embodiments of the disclosure by way of example and not by way of limitation. It is contemplated that the disclosure has general application to providing an on-demand ecosystem in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram of an example multi-party payment card processing system 100 illustrating a delivery service (DS) computing device 116 of a DS computing system 300 (shown in FIG. 3) in communication with a payment processing network 108. Payment card system 100 may enable payment-by-card transactions between merchants 104, cardholders 102, and card issuers 110. Embodiments described herein may relate to a payment card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In payment card system 100, a financial institution such as an issuer 110 issues a payment card or electronic payments account identifier, such as a credit card, to a consumer or cardholder 102, who uses the payment card to tender payment for a purchase from a merchant 104. To accept payment with the payment card, merchant 104 must normally establish an account with a financial institution that is part of the financial payment system. This financial institution is usually called the "merchant bank," the "acquiring bank," or the "acquirer." When cardholder 102 tenders payment for a purchase with a payment card, merchant 104 requests authorization from an acquirer 106 for the amount of the purchase. Such a request is referred to herein as an authorization request message (e.g., ISO® 8583 compliant messages and ISO® 20022 compliant messages). The request may be performed over the telephone, but is usually performed through the use of a point-of-sale terminal, also referred to herein as a point-of-sale device, which reads cardholder's 102 cardholder account 112 information from a magnetic stripe, a chip, or embossed characters on the payment card and communicates electronically with the transaction processing computers of acquirer 106. Alternatively, acquirer 106 may authorize a third party to perform transaction processing on its behalf. In this case, the point-of-sale terminal will be configured to communicate with the third party. Such a third party is usually called a "merchant processor," an "acquiring processor," or a "third party processor."

For card-not-present (CNP) transactions, cardholder 102 provides payment information or billing data associated with the payment card electronically to merchant 104. The payment information received by merchant 104 is stored and transmitted to acquirer 106 and/or payment processing network 108 as part of an authorization request message. In some embodiments, merchant 104 transmits a plurality of authorization request messages together as a "batch" file to acquirer 106 and/or payment processing network 108.

Using payment processing network 108, computers of acquirer 106 or merchant processor will communicate with computers of an issuer 110, to determine whether cardholder account 112 is in good standing and whether the purchase is covered by cardholder's 102 available credit line or account balance. Based on these determinations, the request for authorization will be declined or accepted. If the request is accepted, an authorization code is issued to merchant 104.

In the example embodiment, DS computing device 116 may be in direct communication with payment processing network 108. DS computing device 116 may transmit a request for authorization to payment processing network 108, and receive a response to the request. Based on the response from payment processing network 108 (e.g., authorization request approved or denied), DS computing device 116 may either proceed with or deny delivery services to a user 202 (shown in FIG. 2) of DS computing device 116.

When a request for authorization is accepted, the available credit line or available balance of cardholder account 112 is decreased. Normally, a charge for a payment card transaction is not posted immediately to cardholder account 112 because bankcard associations, such as Mastercard International Incorporated®, have promulgated rules that do not allow merchant 104 to charge, or "capture," a transaction until goods are shipped or services are rendered. However, with respect to at least some debit card transactions, a charge may be posted at the time of the transaction. When merchant 104 ships or delivers the goods or services, merchant 104 captures the transaction by, for example, appropriate data entry procedures on the point-of-interaction terminal. If cardholder 102 cancels a transaction before it is captured, a "void" is generated. If cardholder 102 returns goods after the transaction has been captured, a "credit" is generated. Payment processing network 108 and/or issuer 110 stores the payment card information, such as a category of merchant, a merchant identifier, a location where the transaction was completed, amount of purchase, date of purchase, and time of transaction, in a database 304 (shown in FIG. 3).

After a purchase has been made, a clearing process occurs to transfer additional transaction data related to the purchase among the parties to the transaction, such as acquirer 106, payment processing network 108, and issuer 110. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by issuer 110, cardholder account 112 is decreased. Normally, a charge is posted immediately to cardholder account 112. The payment card association then transmits the approval to the acquiring processor for distribution of goods/services, information, or cash in the case of an automated teller machine (ATM).

After a transaction is authorized and cleared, the transaction is settled among merchant 104, acquirer 106, and issuer 110. Settlement refers to the transfer of financial data or funds among the merchant's 104 account, acquirer 106, and issuer 110 related to the transaction. Usually, transactions are captured and accumulated into a "batch," which is settled as a group. More specifically, a transaction is typically settled between issuer 110 and payment processing network 108, and then between payment processing network 108 and acquirer 106, and then between acquirer 106 and merchant 104.

Figure 2:
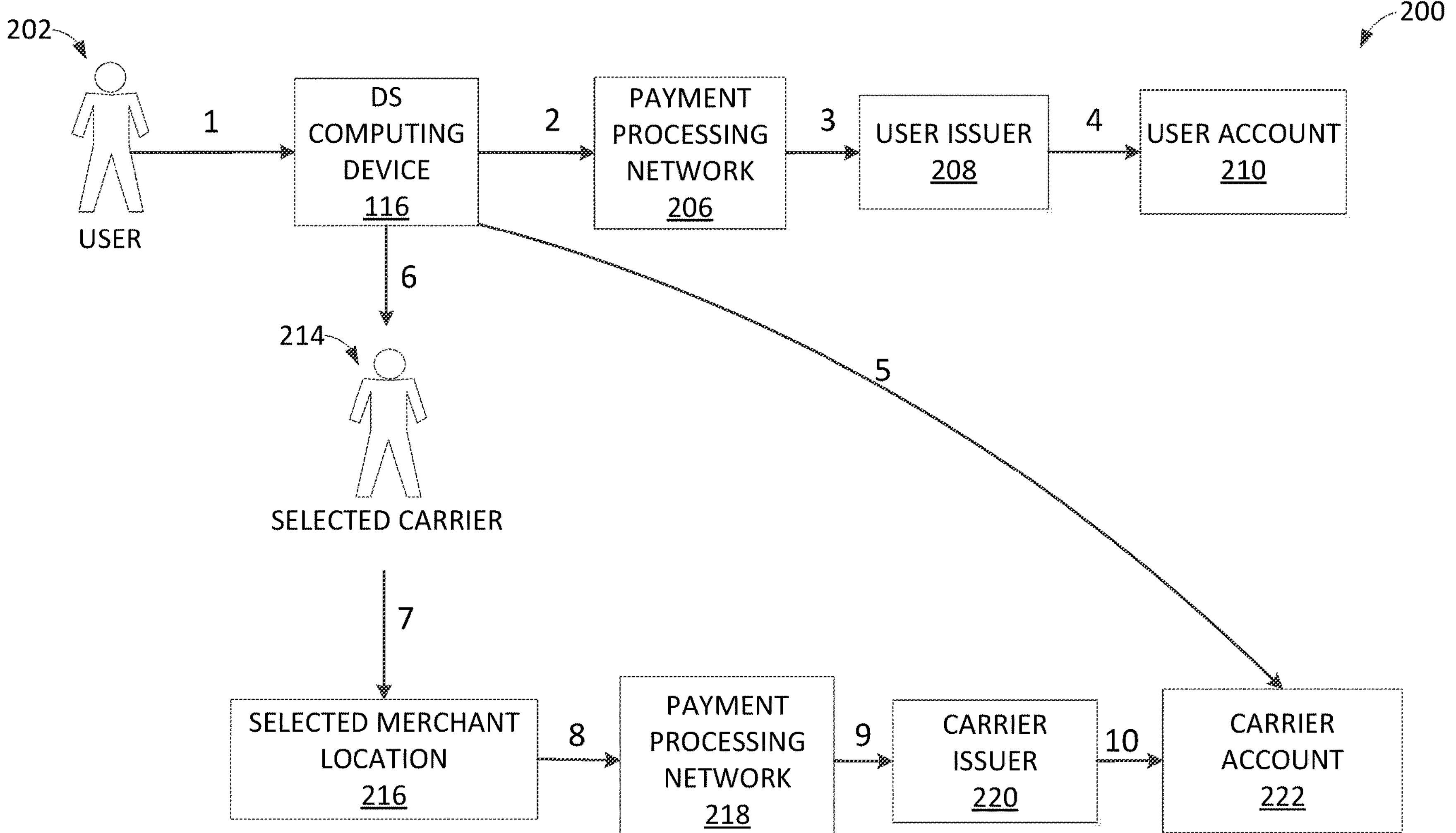

FIG. 2 is an example flow diagram illustrating the flow of payment data. In particular, FIG. 2 depicts the flow of purchase funds between user (e.g., consumer) 202, DS computing device 116, and a selected carrier 214. Prior to the flow of payment data depicted in FIG. 2, user 202 has completed selecting an item for purchase on DS computing device 116, and has selected a registered carrier (e.g., selected carrier 214) to deliver the selected item. In other embodiments, DS computing system 300 (shown in FIG. 3) may provide additional, fewer, or alternative payment data and payment data flow, including those described elsewhere herein.

In the example embodiment, user 202 provides payment information to DS computing device 116 at checkout (step 1). DS computing device 116 applies the payment information (e.g., card/account information) towards a total transaction amount. The payment information may include the name of the account holder (e.g. cardholder), the primary account number (PAN), the date of expiration of the payment card/account, and the security data for the account such as the Card Verification Value (CVV), Card Security Code (CSC), or Card Verification Code (CVC) from the payment card.

A primary account number (PAN) refers to a number of digits (or characters) which identify an account issued by an issuer (for example, a bank). For example, in some embodiments an account (e.g. credit account, debit account, prepaid account) is issued by an issuer pursuant to the MasterCard® International Incorporated rules, and the PAN may be a twelve to nineteen-digit string that identifies both the issuer (e.g. which may be based on the first few digits of the string, for example, the first five to ten digits) and the specific account (e.g. which may be based on some or all of the remaining digits). Those skilled in the art will appreciate that other primary account schemes and formats may be used in conjunction with embodiments described herein.

The total transaction amount includes (i) purchase funds to pay for the cost of items and (ii) a delivery service fee. For example, the total transaction amount paid by user 202 at checkout may be $50. The $50 may represent purchase funds of $40 and a delivery service fee of $10. To process the payment transaction, DS computing device 116 transmits an authorization request message (e.g. a request for authorization) to a payment processing network 206 (step 2). Payment processing network 206 is configured to process financial transactions, and may be similar to payment processing network 108 as shown in FIG. 1. Payment processing network 206 includes at least a payment processor for processing payment transactions. The authorization request message includes the payment information provided by user 202 at checkout. The authorization request message may also include transaction data such as the total transaction amount.

Payment processing network 206 communicates with user issuer 208 (step 3). User issuer 208 (e.g. financial institution, bank) is associated with the payment information user 202 provided at checkout (e.g. credit card, debit card). User issuer 208 (e.g. user's 202 bank) determines whether to approve or decline the request for authorization. User issuer 208 may be similar to issuer 110 (shown in FIG. 1). Upon approval, user issuer 208 decreases the available credit line or available balance of user account 210 by the total transaction amount (step 4). User issuer 208 transmits the total transaction amount via payment processing network 206 to DS computing device 116.

DS computing device 116 then (i) holds the delivery service fee and (ii) transfers the purchase funds to a carrier account 222 (step 5). For example, the total transaction amount received by DS computing device 116 may be $50. The $50 may represent purchase funds of $40 and a delivery service fee of $10. DS computing device 116 transfers $40 to carrier account 222, and holds $10. In the example embodiment, carrier account 222 is a secure virtual account associated with a virtual primary account number (PAN) such that user's 202 payment information is not disclosed to selected carrier 214. Carrier account 222 may be a prepaid virtual PAN associated with a prepaid payment card. In other embodiments, carrier account 222 may also be a single-use account associated with a virtual PAN. In some embodiments, carrier account 222 may be a payment card that is registered to selected carrier 214.

In the example embodiment, carrier account 222 is associated with a secure virtual account number that is protected by a security code. DS computing device 116 generates a security code, and transmits the security code to selected carrier 214 (step 6). The security code may be a one-time personal identification number (PIN) or a passcode. In the example embodiment, DS computing device 116 transmits the security code to a computing device of selected carrier 214. DS computing device 116 may transmit the security code to selected carrier's 214 computing device via email or text message (SMS message). Upon receiving the security code, selected carrier 214 inputs the security code into selected carrier's 214 computing device to access the purchase funds in carrier account 222. Selected carrier's 214 computing device transmits the inputted security code to DS computing device 116. DS computing device 116 compares the input to the generated security code, and if the input matches the generated security code, DS computing device 116 may authorize selected carrier 214 to access the purchase funds in carrier account 222. In some embodiments, a time limit may be associated with the generated security code. For example, DS computing device 116 may require a selected carrier 214 to input the security code into selected carrier's 214 computing device within 5 or 10 minutes of sending the security code to selected carrier 214. In this example, DS computing device 116 may deny access to the purchase funds in carrier account 222 if the security code is not inputted into selected carrier's 214 computing device.

In the exemplary embodiment, the security code transmitted to selected carrier 214 is specific to user 202 and the purchase funds approved by user 202 for a particular transaction. In certain embodiments, a registered carrier may be selected carrier 214 to two users 202. In these embodiments, selected carrier 214 may receive a security code for each user 202. Each security code may be tied to the specific purchase funds approved by each user 202 for use at a selected merchant location. For example, inputting the security code for user A may allow selected carrier 214 to only access user A's purchase funds in carrier account 222 to buy user A's selected items at merchant location A. Subsequent to completing user A's delivery, inputting a different security code for user B may allow selected carrier 214 to only access user B's purchase funds in carrier account 222 to buy user B's selected items at merchant location B.

Selected carrier 214 goes to the selected merchant location 216 to purchase the selected item of user 202. At checkout, selected carrier 214 uses carrier account 222 information (described above) to purchase the selected item (step 7). To process the payment transaction, selected merchant location 216 transmits an authorization request message (e.g. a request for authorization) to a payment processing network 218 (step 8). The authorization request message may also include transaction data such as the selected item purchase amount. Payment processing network 218 may be similar to payment processing network 206 and/or payment processing network 108 (shown in FIG. 1). The authorization request message includes carrier account 222 information provided by selected carrier 214 at checkout. Payment processing network 206 communicates with carrier issuer 220 (step 9). Carrier issuer 220, the bank/financial institution of carrier account 222, determines whether to approve or decline the request for authorization. Carrier issuer 220 may be similar to user issuer 208 and/or issuer 110. Upon approval, carrier issuer 220 decreases the purchase funds of carrier account 222 by the selected item purchase amount (step 10). The selected item purchase amount may be equal to the purchase funds available in carrier account 222. Carrier issuer 220 subsequently transmits the selected item purchase amount via payment processing network 218 to selected merchant location 216 to complete the payment transaction.

After selected carrier 214 delivers the selected item to user 202, DS computing device 116 releases the delivery service fee to selected carrier 214. In some embodiments, DS computing device 116 may transfer the delivery service fee to carrier account 222. In certain embodiments, DS computing device 116 may generate a security code associated with selected carrier 214 that enables selected carrier 214 to access delivery service fees and tips in carrier account 222. In these embodiments, selected carrier 214 may transfer the delivery service fee and tips from carrier account 222 into his or her own personal banking account. For example, if the delivery service fee held by DS computing device 116 was $10, then upon completion of delivery, DS computing device 116 may transfer the $10 to carrier account 222. In other embodiments, the delivery service fee may be transferred to a separate virtual account registered to selected carrier 214 that is specifically for delivery service fees and tips. The separate virtual account may be a prepaid virtual PAN. In further embodiments, DS computing device 116 may transfer the delivery service fee and tips to a personal banking account associated with selected carrier's 214.

In some embodiments, the selected item purchase amount may be less than the purchase funds available in carrier account 222. In these embodiments, remaining purchase funds may exist in carrier account 222 after the payment transaction has been processed. In these embodiments, DS computing device 116 may return the remaining purchase funds to user 202. In some embodiments, the selected item purchase amount may be greater than the purchase funds available in carrier account 222. In these embodiments, the difference of the selected item purchase amount and the purchase funds will be transferred from user account 210 to carrier account 222 using the payment processing steps shown in steps 1-5 of FIG. 2. In these embodiments, DS computing device 116 may display, to user 202, a prompt asking for approval to transfer the difference from user account 210 to carrier account 222.

Figure 3:
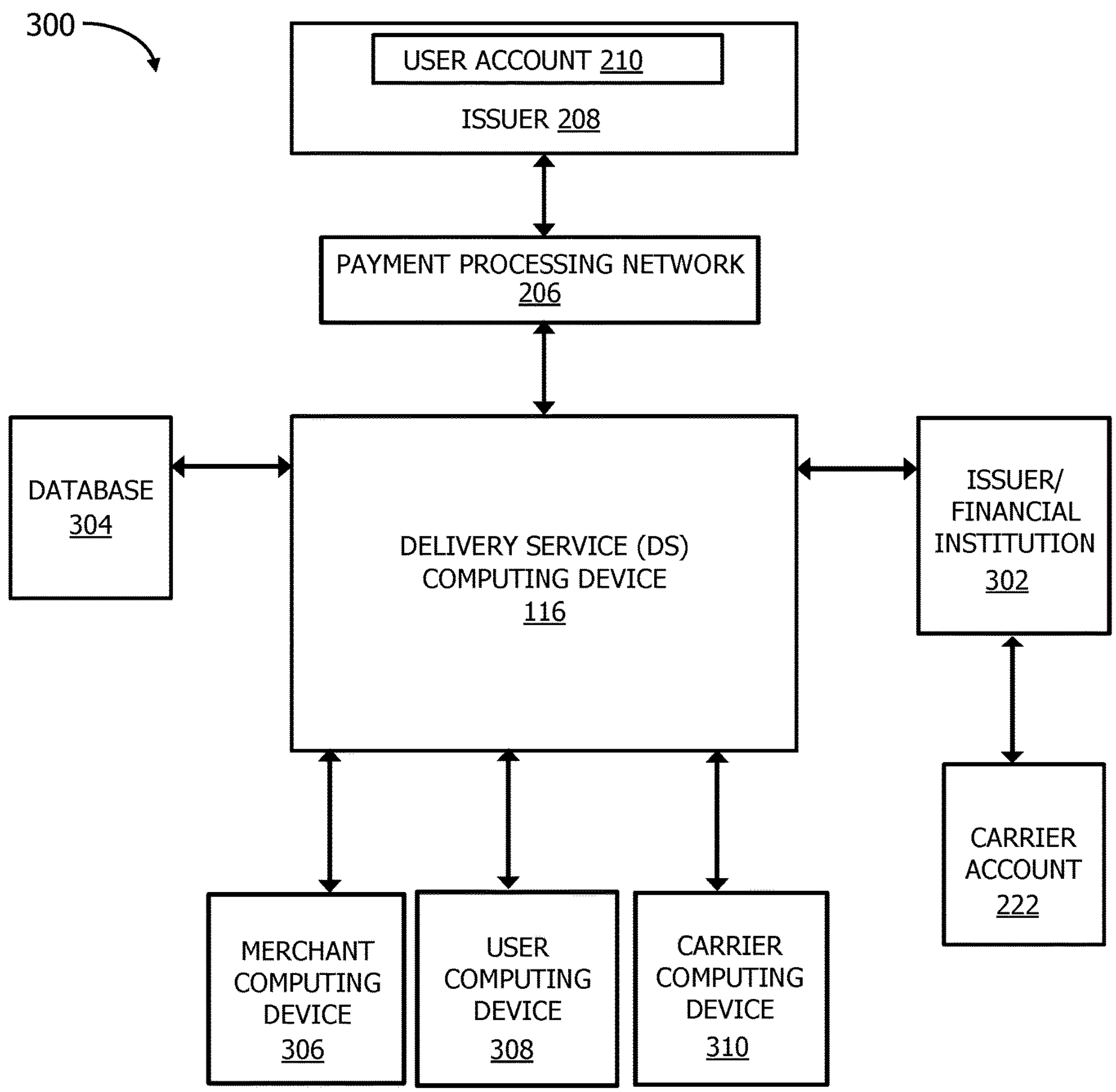

FIG. 3 is a block diagram of an example of a delivery service (DS) system 300 including a delivery service (DS) computing device 116. DS computing device 116 includes at least one processor in communication with a memory. DS computing device 116 is in communication with a database (memory) 304, merchant computing device(s) 306, user computing device(s) 308, carrier computing device(s) 310, user issuer 208 via payment processing network 206, and carrier account 222. In some embodiments, DS computing device 116 may be in communication with carrier account 222 via an issuer/financial institution 302 associated with DS computing device 116. Payment processing network 206 may be similar to payment processing network 108 (shown in FIG. 1). Payment processing network 206 includes at least a payment processor for processing payment transactions. Payment processing network 206 may further include an issuer computing device (where issuer is a bank or financial institution associated with user 202 (e.g., cardholder) and issues payment accounts/cards to user 202), an acquirer computing device (where the acquirer is a bank or financial institution associated with a merchant, e.g., a merchant bank), and a user 202 payment card and/or user computing device 308. Database 304 contains information on a variety of matters, including: item data, cart data, carrier availability data, registered carrier listings, carrier selection rules, verification modules and/or any other information. In some embodiments, database 304 is stored on DS computing device 116. In alternative embodiments, database 304 is stored remotely from DS computing device 116 and may be non-centralized. DS computing system 300 is communicatively coupled to system 100 (shown in FIG. 1) to provide data, such as transaction and account data, to DS computing system 300.

In the example embodiment, DS computing device 116 is configured to transmit/receive transaction data to/from payment processing network 206 to facilitate processing of payment transactions initiated via DS computing system 300. In some embodiments, DS computing device 116 receives payment data from user 202 via user computing device 308. To complete a payment transaction, DS computing device 116 may transmit an authorization request message to payment processing network 206 and user issuer 208. Similar to step 2 of FIG. 2, upon approval, user issuer 208 will transmit the appropriate funds via payment processing network 206 to DS computing device 116 from user account 210. The appropriate funds may include purchase funds to pay for a selected item and a delivery service fee. DS computing device 116 may hold the delivery service fee and transfer the purchase funds to carrier account 222. In some embodiments, purchase funds may be transferred to carrier account 222 via an issuer/financial institution 302 associated with DS computing device 116.

In the example embodiment, DS computing system 300 further includes a plurality of client subsystems, also referred to as client/user systems such as merchant computing device 306, user computing device 308, and carrier computing device 310. As described in greater detail herein, carrier computing device 310 may be associated with DS computing device 116 by registering with DS computing device 116. Computing devices 308 and 310 are computers including a web browser, such that DS computing device 116 is accessible to computing devices 308 and 310 using the Internet. Computing devices 308 and 310 may be any device capable of interconnecting to the Internet including a mobile computing device, such as a laptop or desktop computer, a web-based phone (e.g., a "smartphone"), a personal digital assistant (PDA), a tablet or phablet, a fitness wearable device, a smart refrigerator or other web-connectable appliance, a "smart watch" or other wearable device, or other web-connectable equipment. Merchant computing device 306 may be a server system with a web server in communication with a database associated with a merchant location. DS computing device 116 is communicatively coupled with merchant computing device 306. DS computing device 116 may be in communication with merchant computing device 306 via Application Programming Interface (API) calls. Through API calls, DS computing device 116 may receive item data of a merchant from a merchant database. In some embodiments, DS computing device 116 may store item data retrieved from merchants in database 304. Although one merchant computing device 306, one carrier computing device 310, and one user computing device 308 is shown in FIG. 3, it should be understood that DS computing system 300 may include any number of merchants computing devices 306, carrier computing devices 310, and user computing devices 308.

In one embodiment, DS computing device 116 is configured to communicate with merchant computing device 306, user computing device 308, or carrier computing device 310. Computing devices 308 and 310 are configured to display an app, for example, at a user interface (not shown) of computing device 308 and 310. Users 202 (shown in FIG. 2), via user computing device 308 and/or carriers, via carrier computing device 310 may access the app to register/enroll with DS computing device 116. In some embodiments, carriers are automatically verified by DS computing device 116. In certain embodiments, carriers provide carrier-related data to DS computing device 116 via carrier computing device 310 to facilitate generation of carrier profiles, which are stored in database 304. In some embodiments, the app providing access to DS computing device 116 may have inter-app integration functionality, such that delivery service features of the app may be integrated with, for example, budgeting, invoicing, or inventory tracking services of another application.

Database 304 is communicatively coupled to DS computing device 116. In other embodiments, database 304 is integrated with DS computing device 116 or payment processing network 206 (e.g., a payment processor). Database 304 is configured to receive, store, and transmit data for DS computing device 116. In particular, database 304 may store item data, cart data, data associated with carrier account 222, carrier availability data, registered merchant listings, registered carrier listings, carrier selection rules, verification modules and/or any other information.

Figure 4:
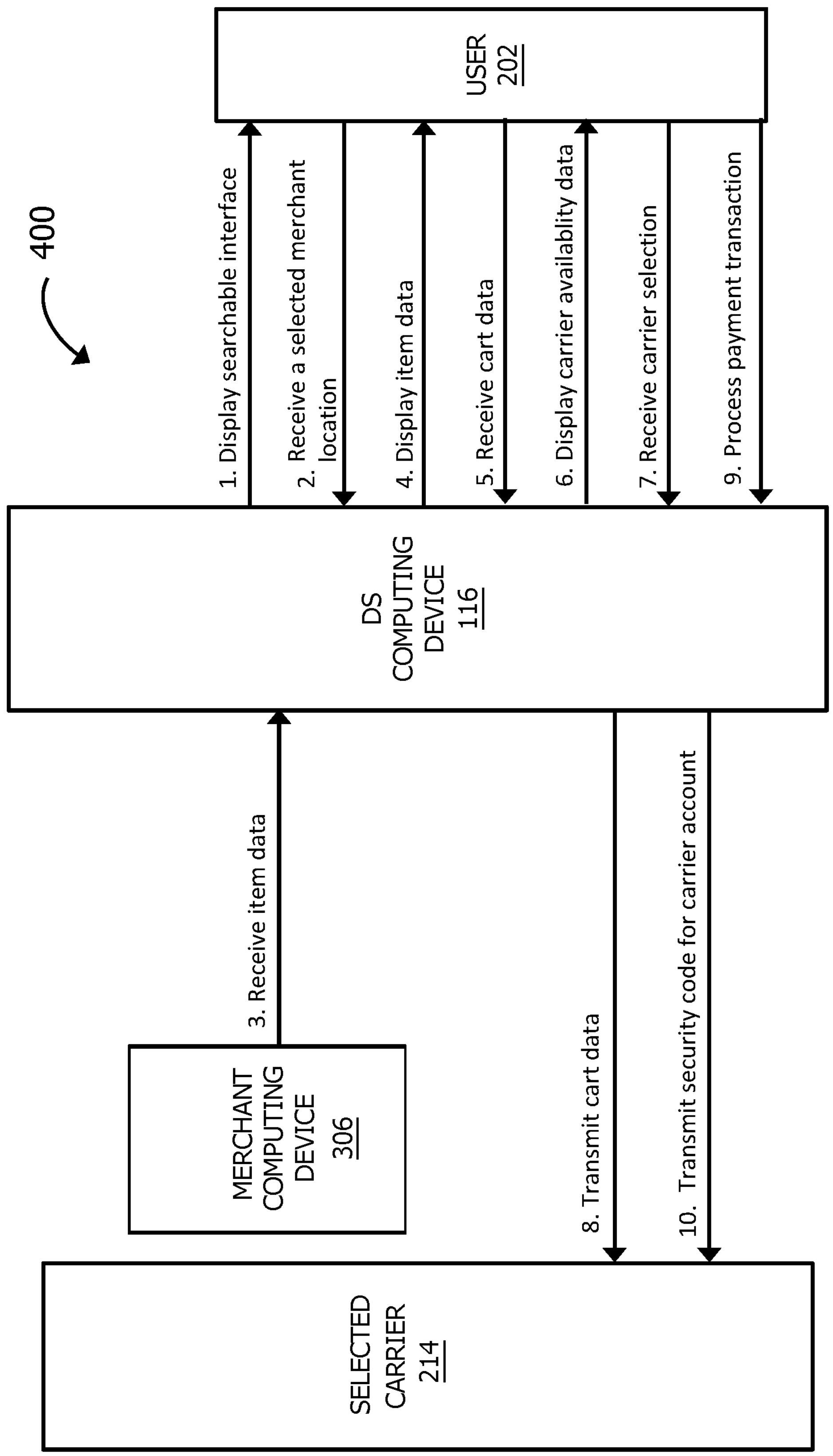

FIG. 4 is an example flow diagram illustrating the flow of data between various components of the DS computing system 300 (shown in FIG. 3). In particular, FIG. 4 depicts the data flow between DS computing device 116, user 202 via user computing device 308 (shown in FIG. 3), merchant computing device 306 (shown in FIG. 3), and selected carrier 214. Prior to the flow of data depicted in FIG. 4, selected carrier 214 has registered with (and in some embodiments, been verified by) DS computing device 116. In other embodiments, DS computing system 300 may provide additional, fewer, or alternative data and data flow, including those described elsewhere herein.

In the example embodiment, DS computing device 116 provides/displays a searchable interface to user 202 that enables user 202 to search (or browse) for merchants (step 1). User 202 may search or browse the searchable interface to find merchants and corresponding merchant locations near user 202. The searchable interface may be a web browser that allows user 202 to enter a specific merchant name and/or merchant website. User 202 may search or browse, for example, by merchant name, item type/category, item name, etc. In some embodiments, merchants may be registered with DS computing device 116. In these embodiments, the searchable interface may provide/display a list of registered merchants and corresponding merchant store locations.

DS computing device 116 receives a selected merchant location (step 2). The selected merchant location is a physical merchant location (e.g., brick-and-mortar store) where a customer may go to purchase items. After using the searchable interface to find a specific merchant, the user may view the available merchant locations in the user's vicinity, and select a merchant location to purchase items from. The selected merchant location may be a local merchant that has only one physical location. DS computing device 116 receives item data of the selected merchant location via merchant computing device 306 (step 3). In the example embodiment, DS computing device 116 is in communication with merchant computing device 306 of the selected merchant location via Application Programming Interface (API) calls. Through the API call, DS computing device 116 may receive item data from the selected merchant location. Item data received by DS computing device 116 includes at least one item offered for sale by the selected merchant location. In some embodiments, item data may include items available for purchase at other merchant locations of the selected merchant. Item data may further include details about each item, such as an item name, an image of the item, a description of the item, an item price, and an item identifier (e.g., a stock keeping unit (SKU) number, bar code, catalog number, etc.). In further embodiments, DS computing device 116 may receive more than one selected merchant location from user 202. In these embodiments, DS computing device 116 may retrieve item data of each selected merchant location via merchant computing device 306. For example, if DS computing device 116 receives selected merchant location A (e.g., a local grocery store) and selected merchant location B (e.g., a local home improvement store) from user 202, DS computing device 116 may retrieve item data of both selected merchant locations A and B to display to user 202.

DS computing device displays the item data received from merchant computing device 306 to user 202 (step 4). User 202 may search or browse the searchable interface to view items offered for sale by the selected merchant location. In some embodiments, user 202 may also search or browse the searchable interface to view items offered for sale by the selected merchant at other merchant location(s) of the selected merchant at which the item is available for purchase. For example, if a specific brand of peanut butter is marked as "sold out" at a nearby location of a chain grocery store, user 202 may browse for the specific brand of peanut butter at other locations of the chain grocery store on the searchable interface.

DS computing device 116 receives cart data from user 202 via the searchable interface (step 5). Cart data identifies a selected item (or items) offered for sale by the selected merchant location. Cart data may further include details about the item selected for purchase, such as an item name, an image of the item, a description of the item, an item price, and an item identifier (e.g., a stock keeping unit (SKU) number, bar code, catalog number, etc.). In some embodiments, cart data may include an estimated item price of the selected item. Cart data may also include item location details for the selected item at the selected merchant location, such as aisle information (e.g. aisle number and/or corresponding shelf number) and a store map. Cart data may include details about the selected merchant location including merchant name, merchant category code (MCC), and merchant address.

Prior to processing a payment transaction (step 9) for the selected item, DS computing device 116 displays carrier availability data to user 202 (step 6). Carrier availability data identifies registered carriers near the selected merchant location who are available to pick-up and deliver the selected item to user 202. A registered carrier's availability is based on carrier profile information submitted by the registered carrier to DS computing device 116. The carrier profile information includes at least one of a carrier identifier (e.g., name, address, locations), available delivery days, available delivery times, available delivery vicinity (e.g., geographic locations and/or boundaries, cities, towns, counties, neighborhoods, streets, etc.), minimum and/or maximum trip distance (e.g., distance from purchase location to delivery location), a delivery fee or fee range, a delivery vehicle type (e.g., compact car, mid-size car, small truck (e.g., Subaru Brat, Ford Ranger), large truck (e.g., Ford F150, F250, F350), a delivery vehicle identifier (make, model, color, license plate number), a delivery vehicle GPS identifier, and a delivery vehicle driver identifier (e.g., driver name, driver license number, photograph, mobile device contact information such as phone number). DS computing device 116 may filter available carriers according to carrier preferences including the item type/category and the number of items carrier is willing to pick-up and deliver. In some embodiments, DS computing device 116 may filter available carriers based on the number of merchant locations a carrier is willing to visit for a single transaction. For example, DS computing device 116 may receive cart data (step 5) that requires a registered carrier to shop for and deliver items on behalf of user 202 at a home improvement store, grocery store, and pet store within 3 hours of user 202 transmitting the cart data to DS computing device 116. In displaying carrier availability data, DS computing device 116 may exclude registered carriers who have indicated that they are unwilling to make multiple stops in a designated period of time. In this example, registered carriers who have indicated that they are willing to visit up to 2 merchant locations in a given period may be included in the carrier availability data displayed to user 202. Additionally or alternatively, in displaying carrier availability data, DS computing device 116 may exclude registered carriers who have indicated that they are unwilling and/or unable to pick up large and/or heavy items.

Carrier availability data displayed to user 202 (step 6) includes an estimated time of delivery of the selected item (or items) to user 202. Carrier availability data may further include a performance rating (e.g., reviews from other users) and a delivery fee for each available carrier. In some embodiments, DS computing device 116 may provide a carrier availability map (e.g., a location map) to user 202. The carrier availability map may display available carriers near the selected merchant location. If user 202 has selected items that require a registered carrier to visit at least two merchant locations, DS computing device 116 may display available carriers near some or all of the selected merchant locations. Available carriers may be indicated on the carrier availability map by icons, symbols, and/or shapes. DS computing device 116 then receives a carrier selection from user 202 (step 7). In some embodiments, subsequent to receiving a carrier selection from user 202, DS computing device 116 may prompt the selected carrier 214 to accept or decline delivery of the selected item. In these embodiments, if the initially selected carrier declines to deliver the selected item, DS computing device 116 may allow a different carrier of the available registered carriers to be selected by user 202.

Following carrier selection (step 7), DS computing device 116 transmits user's 202 cart data (step 8) and user 202 delivery information to selected carrier 214. DS computing device 116 then processes a payment transaction for the selected item (step 9). In the example embodiment, user 202 provides payment information to DS computing device 116, and DS computing device 116 applies the payment information towards a total transaction amount. The total transaction amount paid by user 202 represents purchase funds to pay for the selected item, and a delivery service fee. For example, if DS computing device 116 processed a payment transaction of $50, the purchase funds to pay for the selected item may be $40, and the delivery service fee may be $10.

In the example embodiment, DS computing device 116 holds the delivery service fee and transfers the purchase funds into carrier account 222 (shown in FIG. 2). The delivery service fee may be based on the number of selected items for purchase, the type/category of the selected items for purchase (e.g., delivering 6 cases of bottled water may be more expensive than delivering a carton of eggs), the number of merchant locations selected carrier 214 is required to visit, the distance between multiple merchant locations, the distance from merchant location (or merchant locations) to the delivery address of user 202, the requested delivery time (e.g., a delivery request within 30 minutes may be more expensive than a delivery request within 8 hours), and/or a performance rating of selected carrier 214. In the example embodiment, carrier account 222 is a secure virtual account generated by DS computing device 116, and is available for use during the purchase of the selected item by selected carrier 214. Carrier account 222 is separate from selected carrier's 214 personal bank account. Carrier account 222 may be associated with a secure virtual primary account number (PAN) that has an expiration date and security code. The virtual PAN may be associated with a prepaid payment card.

DS computing device 116 transmits a security code for carrier account 222 to selected carrier 214 (step 10). DS computing device 116 may transmit the security code to selected carrier's 214 carrier computing device 310 (shown in FIG. 3). The security code may be a one-time personal identification number (PIN) or a passcode that provides access to user's 202 purchase funds in carrier account 222. Selected carrier 214 may subsequently enter the received security code into selected carrier's 214 carrier computing device 310 to access the purchase funds associated with user 202 for use during the purchase of the selected item.

Figure 5:
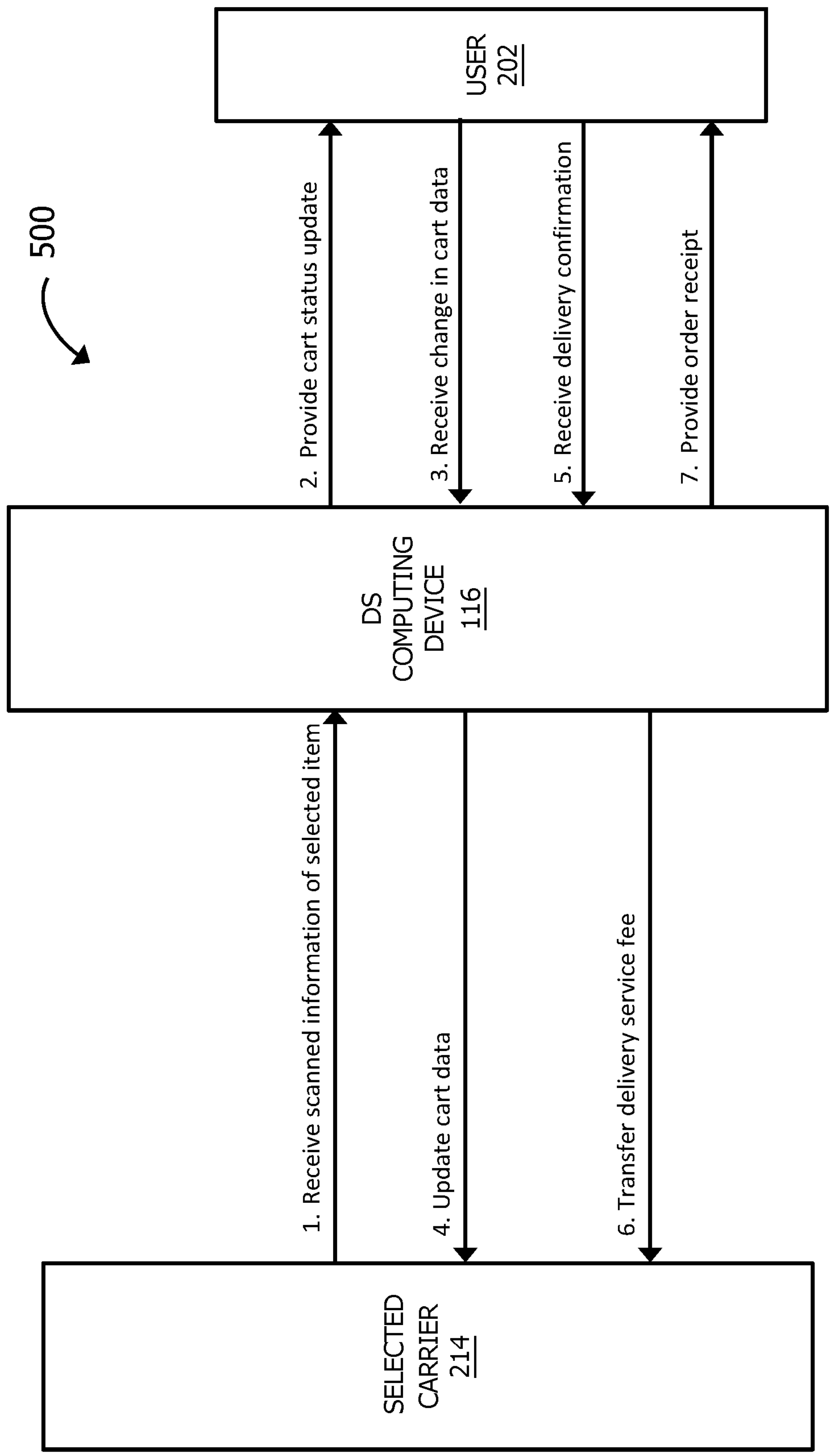

FIG. 5 is another example flow diagram that continues to illustrate the flow of data between the DS computing system 300 components described in FIGS. 3 and 4. In particular, FIG. 5 illustrates the data flow subsequent to selected carrier 214 receiving user's 202 cart data and security code to access user's 202 purchase funds in carrier account 222 (shown in FIG. 2). In other embodiments, DS computing system 300 may provide additional, fewer, or alternative data and data flow, including those described elsewhere herein.

In the example embodiment, DS computing device 116 receives scanned information of the selected item from selected carrier 214 (step 1). The scanned information may be barcode information of the selected item that is scanned by selected carrier 214 via carrier computing device 310 (shown in FIG. 3). In some embodiments, the item information may be a photo of the selected item that is taken by selected carrier's 214 carrier computing device 310. The scanned information received by DS computing device 116 contains an item identifier including at least a stock keeping unit (SKU) number, bar code, catalog number, etc.

DS computing device 116 then provides a cart status update to user 202 using the scanned information received from selected carrier 214 (step 2). Selected carrier 214 scans the selected item with carrier computing device 310 as selected carrier 214 retrieves the selected item. For example, if cart data identifies two selected items for pick-up at a selected grocery store, selected carrier 214 may scan each item with carrier computing device 310 after retrieving the item from the shelf. DS computing device 116 receives the scanned information, and provides user 202 with a real-time update. DS computing device 116 allows user 202 to view the status (e.g., pending pick-up, item retrieved) of the selected item. Using the above example, if selected carrier 214 scans one of the two selected items, DS computing device 116 may display to user 202, a green checkmark next to the item name.

DS computing device 116 is configured to receive changes in cart data from user 202 (step 3). DS computing device 116 is further configured to transmit any changes in cart data to selected carrier 214 by updating cart data (step 4). DS computing device 116 is configured to provide a communication channel (not shown) between selected carrier 214 and user 202 that enables user 202 to make changes to cart data. The communication channel may be any medium that allows selected carrier 214 and user 202 to communicate with each other (e.g., text messages/chat, voice calls, video chat). The changes may be based on the cart status update provided by DS computing device 116 to user 202. Additionally or alternatively, the changes may be based on communications from selected carrier 214 via the communication channel provided by DS computing device 116. For example, selected carrier 214 may communicate to user 202 that the selected item is unavailable (e.g., sold-out) at the selected merchant location. Selected carrier 214 may suggest a similar brand and/or a similar item and provide substitute item information to user 202 via the communication channel provided by DS computing device 116. In some embodiments, the selected item may be more expensive at the selected merchant location. In these embodiments, DS computing device 116 may receive a change in cart data from user 202 reflecting user's 202 approval in purchasing the selected item at the higher price. The difference in item price may be transferred from user account 210 into carrier account 222 using the payment process steps shown in steps 1-5 of FIG. 2.

After selected carrier 214 completes the payment transaction at the selected merchant location using the purchase funds from carrier account 222, selected carrier 214 delivers the selected item (or items) to user 202 (e.g., user's 202 delivery address). DS computing device 116 receives a delivery confirmation from user 202 (step 5). Upon delivery, DS computing device 116 may provide to user 202, on user computing device 308 (shown in FIG. 3), an order complete button that allows user 202 to confirm delivery of requested items by pressing/clicking on it. In some embodiments, DS computing device 116 may require selected carrier 214 to input into user computing device 308, the same security code provided to selected carrier 214 for accessing user's 202 purchase funds in carrier account 222. In some embodiments, DS computing device 116 may require user's 202 signature on selected carrier's 214 carrier computing device 310 to confirm successful delivery.

DS computing device 116 then releases the delivery service fee to selected carrier 214 (step 6), and provides an order receipt to user 202 (step 7). DS computing device 116 may email the order receipt to user 202. The order receipt includes details of the selected item purchased by selected carrier 214 at the selected merchant location and the delivery service fee. The order receipt may include details regarding any changes in cart data. In some embodiments, DS computing device 116 may provide user 202 an option to tip selected carrier 214.

Figure 6:
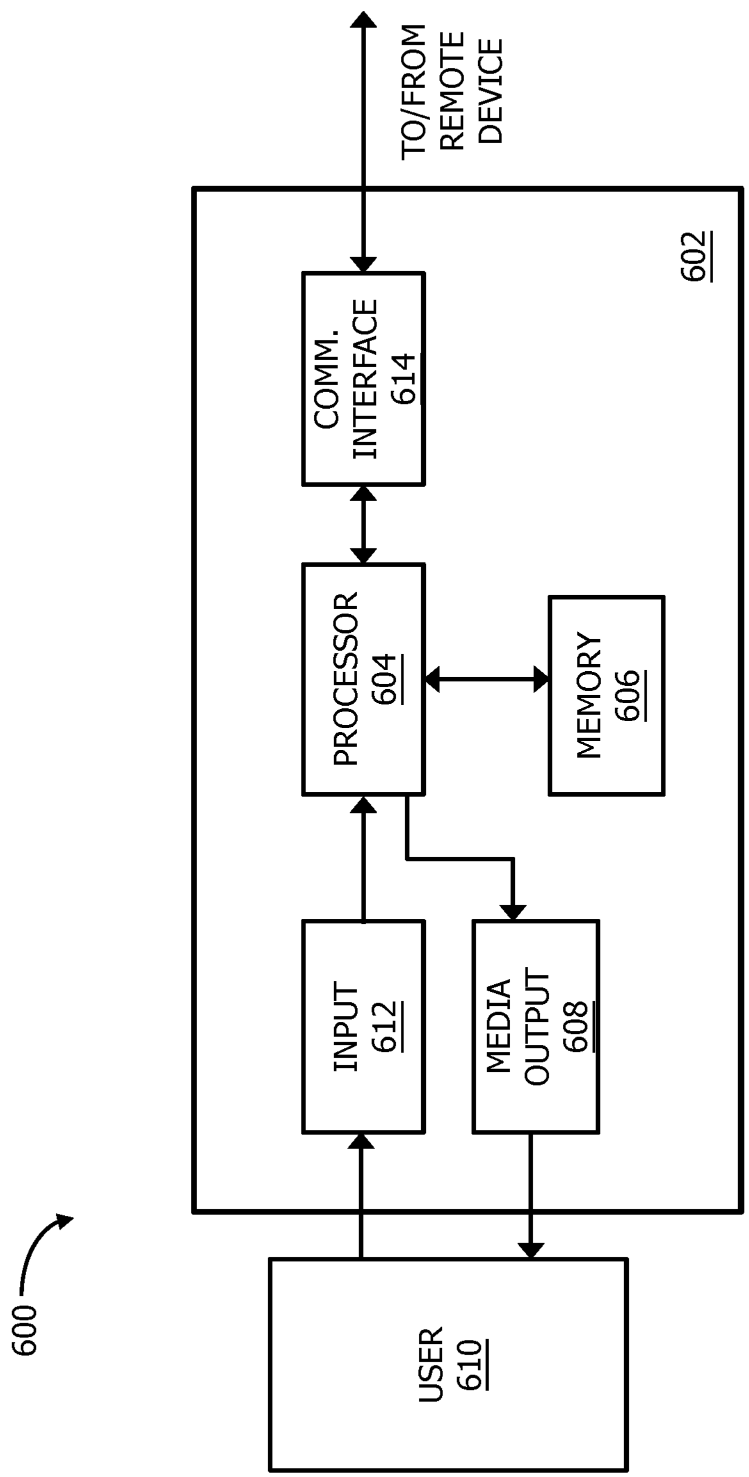

FIG. 6 depicts an exemplary configuration 600 of a remote or client computing device 602, such as user 308 and carrier 310 computing devices (shown in FIG. 3). Computing device 602 includes a processor 604 for executing instructions. In some embodiments, executable instructions are stored in a memory area 606. Processor 604 may include one or more processing units (e.g., in a multi-core configuration). Memory area 606 is any device allowing information such as executable instructions and/or other data to be stored and retrieved. Memory area 606 may include one or more computer-readable media.

Client computing device 602 also includes at least one media output component 608 for presenting information to a user 610. Media output component 608 is any component capable of conveying information to user 610. In some embodiments, media output component 608 includes an output adapter such as a video adapter and/or an audio adapter. An output adapter is operatively coupled to processor 604 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 608 is configured to present an interactive user interface (e.g., a web browser or client application) to user 610.

In some embodiments, client computing device 602 includes an input device 612 for receiving input from user 610. Input device 612 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 608 and input device 612.

Computing device 602 may also include a communication interface 614, which is communicatively coupleable to a remote device such as DS computing device 116 (shown in FIG. 3). Communication interface 614 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 606 are, for example, computer-readable instructions for providing a user interface to user 610 via media output component 608 and, optionally, receiving and processing input from input device 612. A user interface may include, among other possibilities, a web browser and client application. Web browsers enable users 610 to display and interact with media and other information typically embedded on a web page or a website from a web server associated with, for example, a merchant. A client application allows users 610 to interact with a server application associated with, for example, DS computing device 116 and/or other components of DS computing system 300 (shown in FIG. 3). For instance, in some embodiments, client computing device 602 is configured as carrier computing device 310 (shown in FIG. 3) and user 610 may be exemplified as a carrier interacting with DS computing device 116 via media output component 608 and input device 612 to submit carrier registration data, and additionally receive a delivery task and submit a delivery confirmation.

Figure 7:
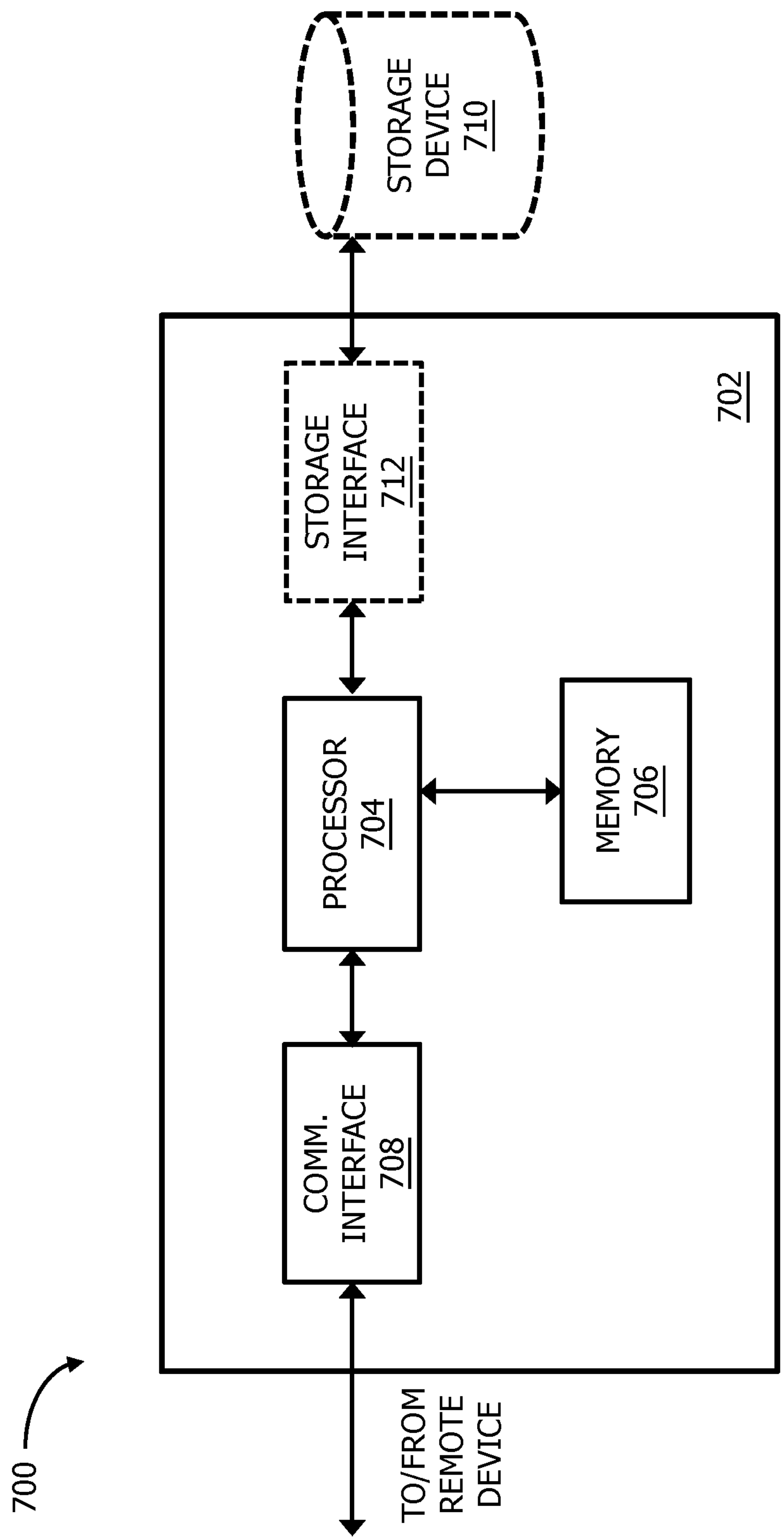

FIG. 7 illustrates an example configuration 700 of a server computing device 702, such as DS computing device 116 and payment processing network 206 (shown in FIG. 2, 3). Server computing device 702 includes a processor 704 for executing instructions. Instructions may be stored in a memory area 706, for example. Processor 704 may include one or more processing units (e.g., in a multi-core configuration).

Processor 704 is operatively coupled to a communication interface 708 such that server computing device 702 is capable of communicating with a remote device such as computing device 602 (shown in FIG. 6) or another server computing device 702. For example, communication interface 708 of DS computing device 116 may receive various data from merchant 306, user 308, and carrier 310 computing devices via the Internet, as illustrated in FIG. 3. As another example, communication interface 708 of payment processing network 212 may receive authorization requests from DS computing device 116 to complete payment transactions initiated via DS computing system 300.

Processor 704 may also be operatively coupled to a storage device 710. Storage device 710 is any computer-operated hardware suitable for storing and/or retrieving data. In some embodiments, storage device 710 is integrated in server computing device 702. For example, server computing device 702 may include one or more hard disk drives as storage device 710. In other embodiments, storage device 710 is external to server computing device 702 and may be accessed by a plurality of server computing devices 702. For example, storage device 710 may include multiple storage units such as hard disks or solid state disks in a redundant array of inexpensive disks (RAID) configuration. Storage device 710 may include a storage area network (SAN) and/or a network attached storage (NAS) system.

In some embodiments, processor 704 is operatively coupled to storage device 710 via a storage interface 712. Storage interface 712 is any component capable of providing processor 704 with access to storage device 710. Storage interface 712 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 704 with access to storage device 710.

Memory areas 606 (shown in FIGS. 6) and 706 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 8:
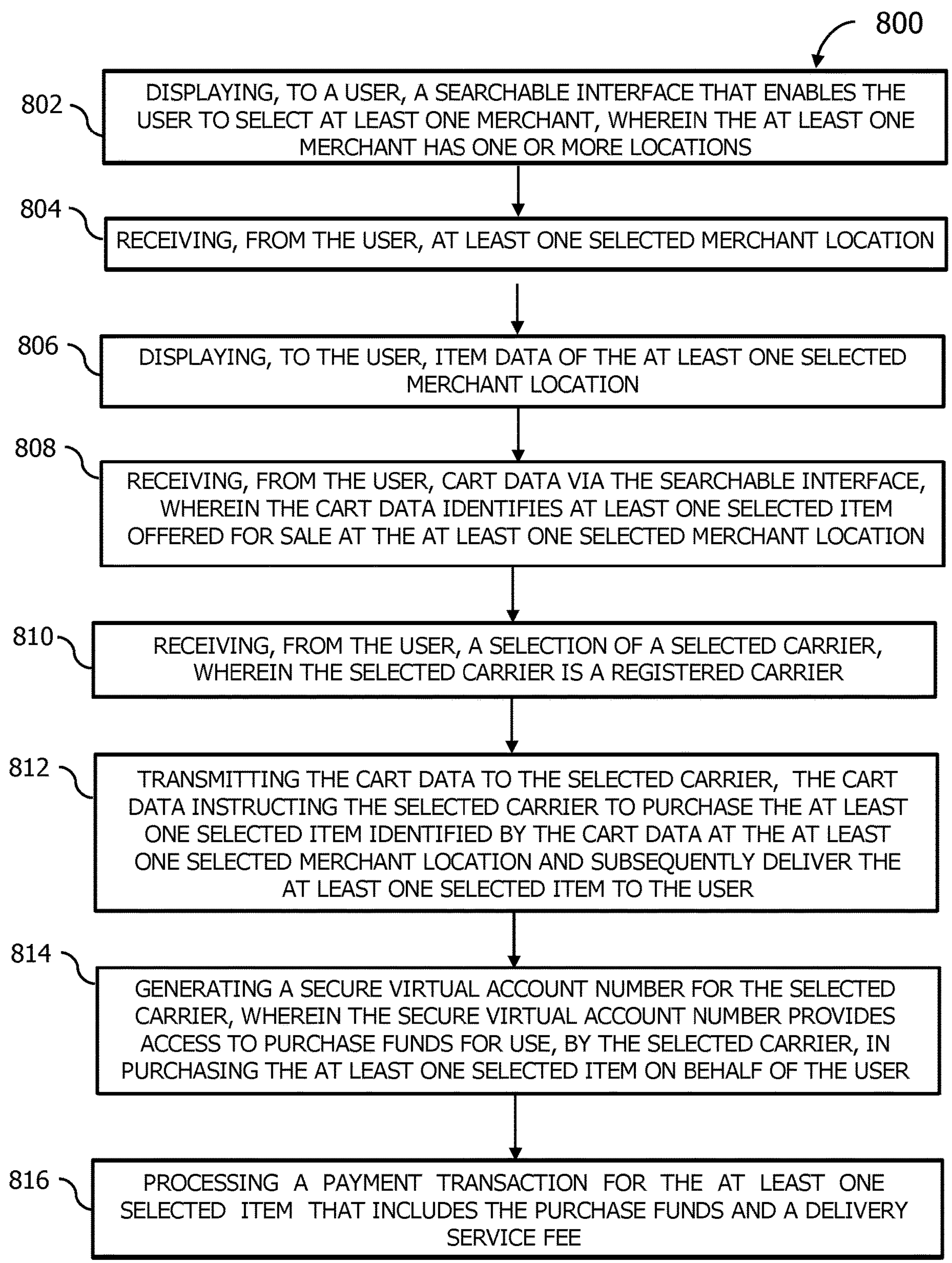

FIG. 8 is a flowchart of a method 800 for providing a delivery service (DS) system, such as system 300 (shown in FIG. 3). In the example embodiment, method 800 is performed by a DS computing device, such as DS computing device 116 (shown in FIG. 3). In certain embodiments, method 800 may be at least partially performed by a different computing device. In other embodiments, method 800 may include additional, fewer, or alternative actions, including those described elsewhere herein.

Method 800 begins with the DS computing device displaying 802 to a user, a searchable interface that enables the user to select at least one merchant. The at least one merchant has one or more locations. Method 800 also includes receiving 804 from the user, at least one selected merchant location, which is associated with the one or more locations of the at least one merchant. Method 800 further includes displaying 806, to the user, item data of the at least one selected merchant location. Method 800 further includes receiving 808, from the user, cart data via the searchable interface. The cart data identifies at least one selected item offered for sale at the at least one selected merchant location. Method 800 also includes receiving 810, from the user, a selection of a selected carrier. The selected carrier is a registered carrier.

Method 800 further includes transmitting 812 the cart data to the selected carrier, the cart data instructing the selected carrier to purchase the at least one selected item identified by the cart data at the at least one selected merchant location and subsequently deliver the at least one selected item to the user. Method 800 further includes generating 814 a secure virtual account number for the selected carrier. The secure virtual account number provides access to purchase funds for use, by the selected carrier, in purchasing the at least one selected item on behalf of the user. Method 800 also includes processing 816 a payment transaction for the at least one selected item that includes the purchase funds and a delivery service fee.

In some embodiments, method 800 further includes providing, to the user, availability data of at least one registered carrier. The availability data includes, for each of the at least one registered carrier, an estimated time of delivery, a delivery service fee, and a performance rating. In some embodiments, item data is retrieved from a merchant computing device. In some embodiments, the delivery service fee is based on at least one of a number of selected items identified by the cart data, a number of selected merchant locations identified by the cart data, and a performance rating of the selected carrier. In some embodiments, method 800 further includes transmitting a security code to the selected carrier. The security code enables the selected carrier to access the purchase funds provided by the secure virtual account number. In some embodiments, cart data includes details of the at least one selected item, the details identifying at least one of an item image, an item description, an item price, an estimated item price, an item identifier, and an item locator information. In other embodiments, method 800 further includes receiving, from the selected carrier, scanned information of the at least one selected item, and providing, to the user, a cart status update based on the scanned information. In some embodiments, method 800 further includes providing a communication channel between the selected carrier and the user. In these embodiments, the communication channel allows the user to make changes to the cart data based on communications received through the communication channel. In some embodiments, method 800 further includes receiving payment information from the user for the payment transaction and processing the payment transaction for the at least one selected item by (i) transferring purchase funds into a carrier account associated with the secure virtual account number, (ii) holding the delivery service fee, and (iii) releasing the delivery service fee into the carrier account upon receiving a confirmation of delivery.

Figure 9:
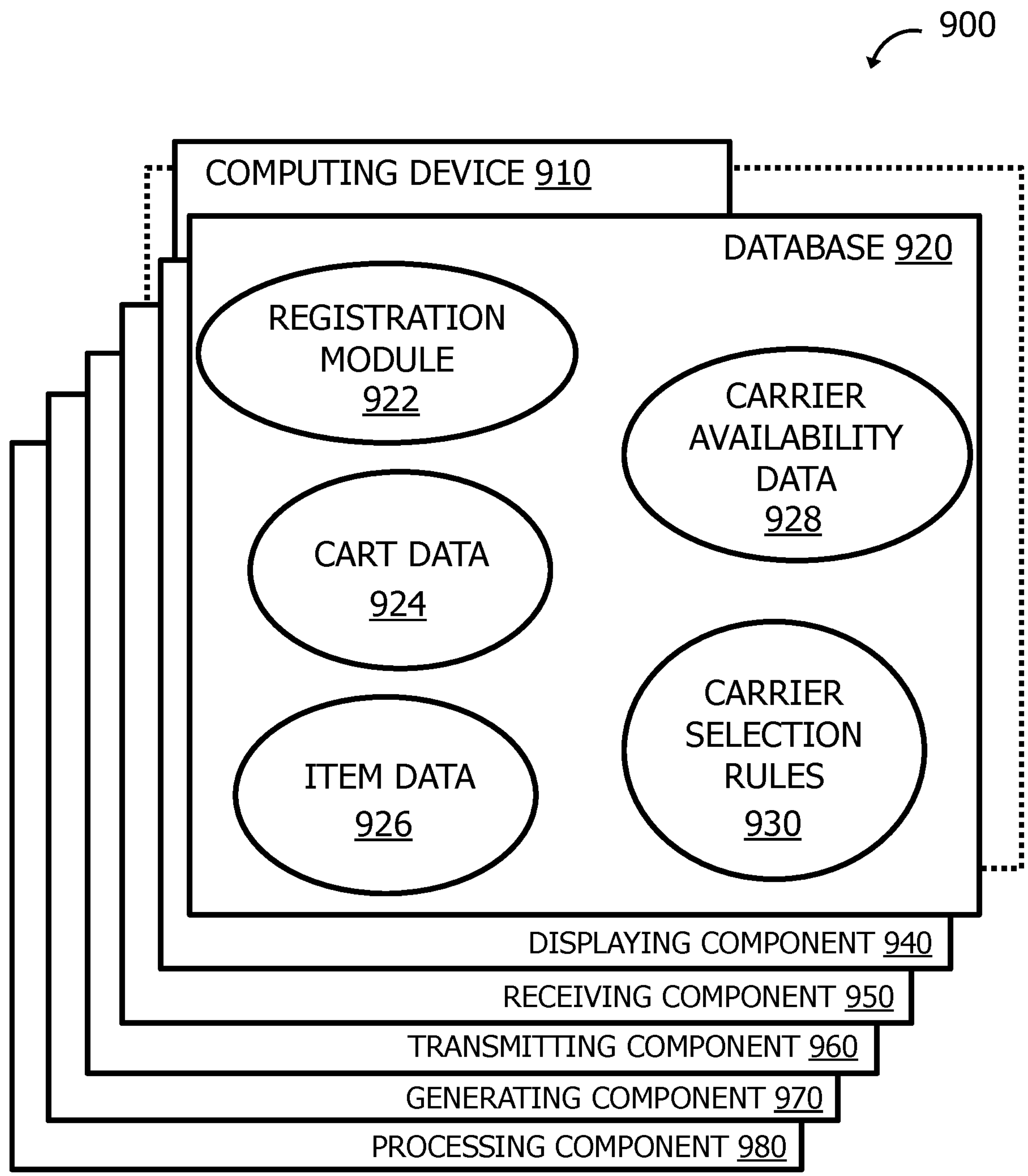

FIG. 9 is a diagram 900 of components of an example computing device 910 that may be used in method 800 (shown in FIG. 8). In some embodiments, computing device 910 is similar to DS computing device 116 (shown in FIG. 1). Computing device 910 includes a database 920 configured to store various information. Database 920 may be similar to database 304 (shown in FIG. 3). Database 920 may be coupled with several separate components within computing device 910, which perform specific tasks. In the illustrated embodiment, database 920 is divided into a plurality of sections and stores, including but not limited to, a registration module section 922, a cart data section 924 (which may include and/or be similar to cart data received at step 5, shown in FIG. 4), an item data section 926 (which may include and/or be similar to item data received at step 3, shown in FIG. 4), a carrier availability data section 928 (which may include and/or be similar to carrier availability data displayed at step 6, shown in FIG. 4), and a carrier selection rules section 930. Database 920 is interconnected to computing device 910 to receive, transmit, and/or update the information as required.

In the example embodiment, computing device 910 includes a displaying component 940 configured to display, to a user, a searchable interface that enables the user to select at least one merchant that has one or more locations. Computing device 910 further comprises a receiving component 950 configured to receive, from the user, at least one selected merchant location associated with the one or more locations of the at least one merchant. Displaying component 940 is also configured to display, to the user, item data of the at least one selected merchant location. Receiving component 950 is also configured to receive, from the user, cart data via the searchable interface. The cart data identifies the selected item (or items) offered for sale at the at least one selected merchant location. Receiving component 950 is additionally configured to receive, from the user, a selection of a selected carrier. The selected carrier is a registered carrier. Computing device 910 further comprises a transmitting component 960 configured to transmit the cart data to the selected carrier so that the selected carrier is prompted or instructed to purchase the selected item (or items) identified by the cart data at the at least one selected merchant location and subsequently deliver the selected item to the user. Computing device 910 further comprises a generating component 970 configured to generate a secure virtual account number for the selected carrier. The secure virtual account number provides access to purchase funds for use, by the selected carrier, in purchasing the selected item (or items) on behalf of the user. Computing device 910 also comprises a processing component 980 configured to process a payment transaction for the selected item (or items) that includes the purchase funds and a delivery service fee.

Described herein are computer systems such as a payment processor (such as a payment processing network), a remote device (such as a merchant computing device, a carrier computing device, and a user computing device) and a DS computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above examples are for example only, and are thus not intended to limit in any way the definition and/or meaning of the term "processor."

The term database, as used herein, refers to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle®

Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor (e.g., 304, 404), including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be included in payment data received by the DS computing device and used as a method of payment for performing a transaction.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the DS computing device are described herein as including general processing and memory devices, it should be understood that the DS computing device is a specialized computer configured to perform the steps described herein for providing a delivery service system to integrate on-demand delivery services within purchase transactions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A delivery service (DS) computing device in communication with a user computing device associated with a user, a merchant computing device, one or more carrier devices, and a payment processing network, the DS computing device including a processor in communication with a memory, said processor programmed to:

cause the user computing device to display a searchable interface configured to enable the user to search for one or more merchant locations, wherein the searchable interface is further configured to present at least one merchant location of the one or more merchant locations;

receive, from the user computing device, a selection of a merchant location from the one or more merchant locations, wherein the selected merchant location is associated with the merchant computing device;

submit, using an Application Programming Interface (API), a query to the merchant computing device of the selected merchant location;

receive, through the API, item data of the selected merchant location from a merchant database associated with the merchant computing device;

display the received item data through the searchable interface on the user computing device;

receive, from the user computing device, via the searchable interface, cart data that identifies at least one selected item from the item data;

cause display of a carrier availability map on the user computing device, the map comprising one or more icons representing one or more available carriers, the one or more icons displayed on the map at a location based on a Global Positioning System (GPS) identifier associated with the one or more available carriers and the selected merchant location, wherein each carrier of the one or more available carriers is associated with a respective carrier computing device of the one or more carrier devices;

receive, from the user computing device, a selection of a carrier from the one or more available carriers;

transmit the cart data to the respective carrier computing device of the selected carrier, the cart data instructing the selected carrier to purchase the at least one selected item identified by the cart data at the selected merchant location and subsequently deliver the at least one selected item to the user;

process a payment transaction for the at least one selected item using payment information associated with the user by transferring purchase funds into a carrier account associated with a secure virtual account number, wherein the carrier account is configured to include purchase funds associated with a plurality of users;

generate a security code associated with the secure virtual account number, wherein the security code is specifically linked only to the transferred purchase funds of the user;

transmit the security code to the respective carrier computing device of the selected carrier;

at a subsequent time, receive the security code from the respective carrier computing device; and in response to receiving the security code from the respective carrier computing device, validate the security code and selectively grant access to only the purchase funds associated with the user for purchasing the at least one selected item.

2. The DS computing device of claim 1, wherein said processor is further programmed to transmit, to the user computing device, availability data of the selected carrier, wherein the availability data includes an estimated time of delivery, a delivery service fee, and a performance rating associated with the selected carrier.

3. The DS computing device of claim 1, wherein the cart data includes details of the at least one selected item, the details identifying at least one of an item image, an item description, an item price, an estimated item price, an item identifier, and an item locator information associated with the at least one selected item.

4. The DS computing device of claim 1, wherein said processor is further programmed to:

receive, from the respective carrier computing device of the selected carrier, scanned information of the at least one selected item; and transmit, to the user computing device, a cart status update based on the scanned information.

5. The DS computing device of claim 1, wherein said processor is further programmed to provide a communication channel between the selected carrier and the user, wherein the communication channel allows the user to make changes to the cart data in real time based on communications received through the communication channel.

6. The DS computing device of claim 1, wherein said processor is further programmed to receive payment information from the user for the payment transaction and process the payment transaction for the selected item by:

holding a delivery service fee; and releasing the delivery service fee into the carrier account upon receiving a confirmation of delivery.

7. A computer-implemented method for providing a delivery service, said method performed using a delivery service (DS) computing device in communication with a user computing device associated with a user, a merchant computing device, one or more carrier devices, and a payment processing network, the DS computing device including a processor in communication with a memory, said method comprising:

cause the user computing device to display a searchable interface configured to enable the user to search for one or more merchant locations, wherein the searchable interface is further configured to present at least one merchant location of the one or more merchant locations;

receiving, from the user computing device, a selection of a merchant location from the one or more merchant locations, wherein the selected merchant location is associated with the merchant computing device;

submitting, using an Application Programming Interface (API), a query to the merchant computing device of the selected merchant location;

receiving, through the API, item data of the selected merchant location from a merchant database associated with the merchant computing device;

displaying the received item data through the searchable interface on the user computing device;

receiving, from the user computing device, via the searchable interface, cart data that identifies at least one selected item from the item data;

causing display of a carrier availability map on the user computing device, the map comprising one or more icons representing one or more available carriers, the one or more icons displayed on the map at a location based on a Global Positioning System (GPS) identifier associated with the one or more available carriers and the selected merchant location, wherein each carrier of the one or more available carriers is associated with a respective carrier computing device of the one or more carrier devices;

receiving, from the user computing device, a selection of a carrier from the one or more available carriers;

transmitting the cart data to the respective carrier computing device of the selected carrier, the cart data instructing the selected carrier to purchase the at least one selected item identified by the cart data at the selected merchant location and subsequently deliver the at least one selected item to the user;

processing a payment transaction for the at least one selected item using payment information associated with the user by transferring purchase funds into a carrier account associated with a secure virtual account number, wherein the carrier account is configured to include purchase funds associated with a plurality of users;

generating a security code associated with the secure virtual account number, wherein the security code is specifically linked only to the transferred purchase funds of the user;

transmitting the security code to the respective carrier computing device of the selected carrier;

at a subsequent time, receiving the security code from the respective carrier computing device; and in response to receiving the security code from the respective carrier computing device, validating the security code and selectively granting access to only the purchase funds for purchasing the at least one selected item.

8. The computer-implemented method of claim 7 further comprising transmitting, to the user computing device, availability data of the selected carrier, wherein the availability data includes an estimated time of delivery, a delivery service fee, and a performance rating associated with the selected carrier.

9. The computer-implemented method of claim 7, wherein the cart data includes details of the at least one selected item, the details identifying at least one of an item image, an item description, an item price, an estimated item price, an item identifier, and an item locator information associated with the at least one selected item.

10. The computer-implemented method of claim 7 further comprising:

receiving, from the respective carrier computing device of the selected carrier, scanned information of the at least one selected item; and transmitting, to the user computing device, a cart status update based on the scanned information.

11. The computer-implemented method of claim 7 further comprising providing a communication channel between the selected carrier and the user, wherein the communication channel allows the user to make changes to the cart data based on communications received through the communication channel.

12. The computer-implemented method of claim 7 further comprising receiving payment information from the user for the payment transaction and processing the payment transaction for the at least one selected item by:

holding a delivery service fee; and releasing the delivery service fee into the carrier account upon receiving a confirmation of delivery.

13. A non-transitory computer-readable storage media having computer-executable instructions embodied thereon, wherein when executed by a delivery service (DS) computing device in communication with a user computing device associated with a user, a merchant computing device, one or more carrier devices, and a payment processing network, the DS computing device including at least one processor coupled to a memory, the computer-executable instructions cause the DS computing device to:

cause the user computing device to display a searchable interface configured to enable the user to search for one or more merchant locations, wherein the searchable interface is further configured to present at least one merchant location of the one or more merchant locations;

receive, from the user computing device, a selection of a merchant location from the one or more merchant locations, wherein the selected merchant location is associated with the merchant computing device;

submit, using an Application Programming Interface (API), a query to the merchant computing device of the selected merchant location;

receive, through the API, item data of the selected merchant location from a merchant database associated with the merchant computing device;

cause to display the received item data through the searchable interface on the user computing device;

receive, from the user computing device, via the searchable interface, cart data that identifies at least one selected item from the item data;

cause display of a carrier availability map on the user computing device, the map comprising one or more icons representing one or more available carriers, the one or more icons displayed on the map at a location based on a Global Positioning System (GPS) identifier associated with the one or more available carriers and the selected merchant location, wherein each carrier of the one or more available carriers is associated with a respective carrier computing device of the one or more carrier devices;

receive, from the user computing device, a selection of a carrier from the one or more available carriers;

transmit the cart data to the respective carrier computing device of the selected carrier, the cart data instructing the selected carrier to purchase the at least one selected item identified by the cart data at the selected merchant location and subsequently deliver the at least one selected item to the user;

process a payment transaction for the at least one selected item using payment information associated with the user by transferring purchase funds into a carrier account associated with a secure virtual account number, wherein the carrier account is configured to include purchase funds associated with a plurality of users;

generate a security code associated with the secure virtual account number, wherein the security code is specifically linked only to the transferred purchase funds of the user;

transmit the security code to the respective carrier computing device of the selected carrier;

at a subsequent time, receive the security code from the respective carrier computing device; and in response to receiving the security code from the respective carrier computing device, validate the security code and selectively grant access to only the to purchase funds for purchasing the at least one selected item.

14. The computer-readable storage media of claim 13, wherein the computer-executable instructions further cause the DS computing device to transmit, to the user computing device, availability data of the selected carrier, wherein the availability data includes an estimated time of delivery, a delivery service fee, and a performance rating associated with the selected carrier.

15. The computer-readable storage media of claim 13, wherein the computer-executable instructions further cause the DS computing device to receive payment information from the user for the payment transaction and process the payment transaction for the at least one selected item by:

holding a delivery service fee; and transferring the delivery service fee into the carrier account upon receiving a confirmation of delivery.

* * * * *